United States Patent
Panchaksharaiah et al.

(10) Patent No.: US 9,942,615 B1
(45) Date of Patent: Apr. 10, 2018

(54) SYSTEMS AND METHODS FOR PRESENTING TARGETED METADATA IN DISPLAY CONSTRAINED ENVIRONMENTS

(71) Applicant: Rovi Guides, Inc., San Carlos, CA (US)

(72) Inventors: Vishwas Sharadanagar Panchaksharaiah, Tiptur (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/492,468

(22) Filed: Apr. 20, 2017

(51) Int. Cl.
| G06F 3/00 | (2006.01) |
| G06F 13/00 | (2006.01) |
| H04N 5/445 | (2011.01) |
| H04N 21/482 | (2011.01) |
| H04N 21/45 | (2011.01) |
| H04N 21/84 | (2011.01) |
| H04N 21/485 | (2011.01) |
| G06F 17/30 | (2006.01) |

(52) U.S. Cl.
CPC ..... H04N 21/4826 (2013.01); G06F 17/3084 (2013.01); G06F 17/30846 (2013.01); G06F 17/30858 (2013.01); H04N 21/4524 (2013.01); H04N 21/4532 (2013.01); H04N 21/4821 (2013.01); H04N 21/4858 (2013.01); H04N 21/84 (2013.01)

(58) Field of Classification Search
CPC ........... H04N 21/4826; H04N 21/4524; H04N 21/4532; H04N 21/4821; H04N 21/4858; H04N 21/84; G06F 17/3084; G06F 17/30846; G06F 17/30858

See application file for complete search history.

(56) References Cited

U.S. PATENT DOCUMENTS

| 7,185,355 | B1 | 2/2007 | Ellis et al. | |
| 8,082,568 | B2 | 12/2011 | Ellis | |
| 8,219,927 | B2 | 7/2012 | Gatlin et al. | |
| 8,843,963 | B2 | 9/2014 | Boylan et al. | |
| 2003/0225777 | A1* | 12/2003 | Marsh | H04N 7/163 |
| 2006/0254409 | A1* | 11/2006 | Withop | G06F 17/30029 84/601 |
| 2008/0022307 | A1* | 1/2008 | Jeong | H04N 21/443 725/44 |

(Continued)

FOREIGN PATENT DOCUMENTS

WO   WO 00/79798   12/2000

*Primary Examiner* — Oleg Asanbayev
(74) *Attorney, Agent, or Firm* — Haley Guiliano LLP

(57) ABSTRACT

Systems and methods are described for presenting targeted metadata associated with media asset identifiers. For example, based on stored user preferences (e.g., the user likes a particular actor) and context (e.g., whether an actor is trending on social media near the user's location), the systems and methods may rank attributes associated with the media asset (e.g., title, actors, director, genre, etc.). The systems and methods may then determine a number of attributes that can be displayed based on a size of the media asset identifier (e.g., a cell in a grid-guide) and select the number of attributes that can be displayed (e.g., based on the number of characters, the top two ranked attributes are selected). The systems and methods then display the media asset identifier (e.g., the cell in the grid-guide) with the selected attributes.

18 Claims, 8 Drawing Sheets

(56) References Cited

U.S. PATENT DOCUMENTS

| | | |
|---|---|---|
| 2008/0104058 A1 | 5/2008 | Billmaier et al. |
| 2008/0178073 A1* | 7/2008 | Gao ........................ G06F 17/24 |
| | | 715/243 |
| 2013/0074109 A1 | 3/2013 | Skelton et al. |
| 2014/0123165 A1* | 5/2014 | Mukherjee ....... H04N 21/44222 |
| | | 725/14 |
| 2015/0135101 A1* | 5/2015 | Ellis .................. G06F 17/30991 |
| | | 715/762 |
| 2015/0135225 A1* | 5/2015 | Bayer ................ H04N 21/4826 |
| | | 725/46 |

* cited by examiner

SYSTEMS AND METHODS FOR PRESENTING TARGETED METADATA IN DISPLAY CONSTRAINED ENVIRONMENTS

BACKGROUND

Given the plethora of media content available to consumers, it can be difficult to navigate listings for the media content and determine what to consume. Specifically, conventional systems typically include the title of the media content in a listing and little other identifying information. Instead, conventional systems require a user to select the listing to obtain more information. In this approach, a user may have to select many different listings (e.g., by pressing an "INFO" key on a remote control), since the title alone is not enough information for the user to determine if he or she wants to consume the media content. To address this problem, some conventional systems allow a user to select particular fields (e.g., title) for inclusion in a guide. However, this approach is consistently applied for all media assets, and many users may still want additional information to determine what media content to consume, as well as targeted information based on more than just the user's own preferences.

SUMMARY

Accordingly, systems and methods are described herein for presenting targeted metadata associated with media asset identifiers. For example, based on stored user preferences (e.g., the user likes a particular actor) and context (e.g., whether an actor is trending on social media near the user's location), the systems and methods may rank attributes associated with the media asset (e.g., title, actors, director, genre, etc.). The systems and methods may then determine a number of attributes that can be displayed based on a size of the media asset identifier (e.g., a cell in a grid-guide). The systems and methods may then select the number of attributes that can be displayed based on the ranking (e.g., if two attributes can fit in a cell of a grid-guide, then the top two ranked attributes may be selected). The systems and methods then display the media asset identifier (e.g., the cell in the grid-guide) with the selected attributes.

In some aspects, a media guidance application may retrieve a plurality of attributes associated with a media asset. For example, the media guidance application may retrieve the plurality of attributes from local storage or a remote server (e.g., from a media guidance database). For example, the media guidance application may transmit a query including an identifier of the media asset to a database including a plurality of attributes associated with media assets. Based on the transmitted query, the media guidance application may receive the plurality of attributes associated with the media asset (e.g., in a list or other data structure). As a specific example, the database may contain a plurality of tables, where each table is associated with a media asset, and each row of each table contains an attribute associated with the media asset. The row may also include a type of each attribute in another associated field (e.g., "actor"). The identifier of the media asset may be any combination of characters that are unique to the media asset. For example, the identifier may be the title of the media asset, or a number assigned by a content provider.

The media guidance application may generate a score for each attribute of the plurality of attributes. For example, the media guidance application may assign a numerical value to each attribute of the plurality of attributes indicating how relevant the attribute is to the user given the user's preferences and context of the attribute. Specifically, when generating the score, the media guidance application may determine, based on a current time and a location of a user, a context for each attribute. For example, the context may be any one or combination of the current season (e.g., Christmas time), the current time (e.g., afternoon), the user's location (e.g., Ohio). For example, the media guidance application may determine the current time based on a current clock time. The media guidance application may determine the location based on GPS coordinates of a device of the user and/or based on entry of the location by the user. For example, the media guidance application may prompt the user to enter his or her current location via a user input device. The media guidance application may then compare the determined location and current time to a data structure that maps attributes and/or attribute types to current times and/or locations. For example, the data structure may be a table where each row contains a range of times and/or locations that correspond to a given context. For example, the context "Christmas" may correspond to December $1^{st}$ to $30^{th}$ in North America and Europe. The data structure may, for each context, include an indication of which types of attributes (e.g., genre, actor, etc.) or specific attributes (e.g., "Christmas movie") correspond to the context. Thus, if a particular attribute associated with a media asset is that the media asset is a "Christmas movie," the context "Christmas" may be assigned if the time determined was December $10^{th}$ and the location was Ohio. The media guidance application may generate a list or other data structure with a plurality of fields for the plurality of attributes each with associated fields for the context. For example, the media guidance application may execute a program script that iteratively writes a context to each field associated with each attribute (e.g., by determining whether the current time and/or location are associated with an attribute as discussed above).

In some embodiments, the media guidance application may transmit, to a social media website, the current time and location. For example, the media guidance application may transmit a data packet including a data structure with the value for the current time (e.g., an integer or series of integers) and location (e.g., GPS coordinate or a string of text identifying the location such as "Ohio"). The social media website may contain a data structure with currently relevant (e.g., "trending") topics. For example, the topics may be relevant because they are the topics that the most people in a given location at a given time are posting about. The media guidance application may receive, from the social media website, a data structure including a plurality of topics at the current time and the location. For example, the media guidance application may receive a table with a plurality of entries, each associated with a topic that is currently relevant at the current time and the location of the user. As an example, the user may be located in New York City and it may be New Year's Eve. The media guidance application may receive, from the social media website, a table with entries for topics such as "Ball drop," "NYE 2016," "Resolutions," etc. The entries in the table may include the text that summarizes the topic (e.g., the word "Resolutions" appears in many posts) and/or may be based on tags, such as hashtags (e.g., #resolutions).

The media guidance application may then compare each attribute to each topic of the plurality of topics received from the social media website. For example, the media guidance application may execute a program script utilizing a for-loop and retrieve the value (e.g., the string of characters defining each topic) from the table received from the social media website. The media guidance application may compare the characters of each retrieved topic with characters of each attribute to determine whether a given attribute is relevant (e.g., trending). The media guidance application may identify, based on the comparison, that a first subset of the plurality of attributes associated with the media asset each correspond to a respective topic of the plurality of topics. For example, the media guidance application may identify a subset of the plurality of attributes associated with the media asset that do correspond to topics in the table received from the social media website. For example, many users in New York City may be posting about "New York Knicks" and "Amy Schumer," and the table received from the social media website may contain entries for those two topics. The media guidance application may determine that the "New York Knicks" and "Amy Schumer" match attributes associated with the movie "Trainwreck" for which a media asset identifier is to be displayed. The media guidance application may determine the context for each attribute in the first subset based on the corresponding topic of the plurality of topics. For example, the context may be that the topic matches the exact text of the attribute (e.g., "Amy Schumer"). As another example, the topic may not match the text of the attribute, but may match a category or otherwise be associated with the attribute. For example, the media guidance application may determine that a topic in the data structure received from the media guidance application is "sports," which is related to but not equivalent to "New York Knicks." The media guidance application may determine that the attribute is related to a topic based on a stored rule-set. For example, for the location "New York," the media guidance application may access a "New York" database that includes categories (e.g., sports) and teams (e.g., "Knicks"), locations ("Madison Square Garden") etc. associated with the category to determine that an attribute is related to a topic.

In some embodiments, the media guidance application may compare the current time and the location of the user to a plurality of current times and locations stored in a database. For example, the media guidance application may access the database locally in storage or at a remote server. The database may be structured as a table where each row in the table includes fields with a time or range of times and location or range of locations and corresponding fields with context mappings. For example, from October 20$^{th}$ to October 31$^{st}$ in North America may correspond to context mapping, "Halloween." The media guidance application may determine that the current time and location of the user matches a stored time and a stored location in the database. For example, the media guidance application may compare the values for the current time and the location of the user to values stored in the database to determine a match. The media guidance application may then retrieve, from a field associated with the matched stored time and the matched stored location, a context mapping for attributes. For example, the media guidance application may determine that a user in "Ohio" on October 27$^{th}$ fulfills both criterions to be considered in the "Halloween" context mapping and retrieves an identifier (e.g., "Halloween") from the field associated with the context mapping.

The media guidance application may then process each attribute of the plurality of attributes associated with the media asset with the context mapping for attributes. For example, the media guidance application may access another database or another row in the same database (e.g., linked via a pointer) which includes attributes that the context mapping is applicable to. For example, the "Halloween" context mapping may be relevant to attributes, "ghost movie," "scary movie," "Dracula," etc. The media guidance application may then process the attributes associated with the media asset to determine whether they match the attributes identified as relating to the context mapping. For example, a movie with an attribute "Dracula" may match one of the attributes associated with the "Halloween" context mapping. Thus, the media guidance application may assign the attribute a context (e.g., "Halloween movie near Halloween") which may result in a higher ranking for the attribute (e.g., Dracula) than at other times of the year. The media guidance application may process the context to determine a context value (e.g., which can be used to rank the attributes), as described further below.

The media guidance application may, when generating the score, determine, from a user profile associated with the user, a user preference for each attribute. For example, the media guidance application may retrieve a user profile associated with the user from local storage or from a remote server. The media guidance application may then retrieve stored characteristics and preferences of the user from the user profile. For example, the media guidance application may retrieve a viewing history of the user and determine common attributes (e.g., indicating that the user has a preference for the attribute). As a specific example, the media guidance application may determine from a viewing history for the user that the user has watched seven movies with "Seth Rogen," and thus the user has a preference for Seth Rogen movies. The media guidance application may analyze a threshold amount of time (e.g., one month) from the current time. For example, the media guidance application may determine that over the past week the user has viewed multiple movies of the "action" genre. The media guidance application may determine that an attribute is a common attribute if the attribute appears a threshold number of times in the user's viewing history (e.g., four times). The media guidance application may determine a preference from an explicit indication from the user (e.g., a stored list of attributes the user likes). For example, the media guidance application may store a list of attributes (e.g., actors) that the user has indicated that they like. Alternatively or additionally, the media guidance application may store a relative amount that the user likes a given attribute (e.g., 10/10). The media guidance application may generate for display a graphical user interface allowing the user to input (e.g., via a user input interface) attributes that the user is interested in (e.g., the user may input, "Seth Rogen" via a keyboard). The media guidance application may generate a list or other data structure with a plurality of fields for the plurality of attributes each with associated fields for the user preference. For example, the media guidance application may execute a program script that iteratively writes a context to each field associated with each attribute (e.g., by determining whether any user preferences are associated with the attribute as discussed above).

In some embodiments, the media guidance application may retrieve the user profile. For example, the media guidance application may retrieve the user profile from local storage or a remote server (e.g., via a communications network). The user profile may be any suitable data structure for storing preferences and data relating to the user. For example the user profile may be a table or series of tables (e.g., linked via pointers). The media guidance application may retrieve user preferences for the user from the user profile. For example, the media guidance application may execute an SQL script (e.g., utilizing the "Select" statement) to retrieve data from particular fields in the user profile. The media guidance application may compare each attribute to each user preference of the user preferences. For example, the media guidance application may compare each retrieved user preference with each attribute of the plurality of attributes associated with the media asset. For example, the media guidance application may compare the characters of the user preference and the characters of a particular attribute to determine whether they match. As a specific example, the media guidance application may determine that a user preference for the actor, "Tom Hanks" matches an attribute "Tom Hanks" associated with the media asset "Forrest Gump." The media guidance application may identify, based on comparing each attribute to each user preference of the user preferences, that a second subset of the plurality of attributes associated with the media asset each correspond to a respective user preference of the user preferences. For example, the media guidance application may determine the subset of the plurality of attributes that match a user preference stored in the user profile. The media guidance application may then determine the user preference for each attribute in the second subset based on the corresponding user preference of the user preferences. For example, the media guidance application may generate a list or other data structure including an identifier of each attribute of the second subset and an indication that the attribute matched a user preference. In some embodiments, the media guidance application may additionally store a type of user preference matched (e.g., based on a viewing history or a user favorite actors list etc.).

The media guidance application may, when generating the score, assign both (1) a context value to each attribute based on the context and (2) a user weighting to each attribute based on the user preference. For example, the media guidance application may retrieve a list or other data structure with a plurality of fields for the plurality of attributes each with associated fields for the context and the user preference. The media guidance application may process the list or other data structure (e.g., by reading in strings of text or values corresponding to the context and the user preference for each attribute). The media guidance application may then assign a context value based on an algorithm mapping the context value and the user weighting for each attribute to a numerical score. For example, if the time is December 10$^{th}$, which corresponds to a context of Christmas time and an attribute of a media asset is that it is a "Christmas movie," the media guidance application may assign a higher score to the "Christmas movie" attribute than it would at a different time of year (e.g., Summer). The media guidance application may similarly assign a user weighting based on the user preference. For example, the media guidance application may assign a greater user weighting to an attribute (e.g., "Seth Rogen") that matches a user preference than one that does not. For example, the exact value of the user weighting may depend on a relative amount that the user likes the attribute (e.g., a stored user preference for an attribute of 5/10 may correspond to a lower weighting than 8/10). As another example, the exact value of the user weighting may depend on the number of times a user has viewed media assets associated with the attribute (e.g., if a user has watched two movies with "Seth Rogen" the weighting may be lower than if the user has watched ten movies with "Seth Rogen"). The media guidance application may assign the context value and/or the user weighting based on a rule-set mapping contexts and/or user weightings to particular values. In some embodiments, the values may be positive or negative and may correspond to adjustments from default values for the attributes, as discussed further below.

The media guidance application may, when generating the score, calculate the score based on the context value for each attribute and the user weighting for each attribute. For example, the media guidance application may combine the user weighting and the context value to generate a single composite score for each attribute. As a specific example, if the scores are based on a ten point scale, and the context value is 4 and the user weighting is 4, the media guidance application may calculate a value of 8. In some embodiments, the media guidance application adjusts default values (e.g., which may be set to the same value, or set to specific values that are different for each attribute) based on the calculated score. For example, if the default score is 5 and the media guidance application determines that the context value is −1 and the user weighting is +3 for a given attribute, the media guidance application may calculate a score of 7 for the attribute.

In some embodiments, the media guidance application may calculate the score by adjusting default scores for attributes. Specifically, the media guidance application may retrieve a data structure with default scores for the plurality of attributes associated with the media asset. For example, the media guidance application may retrieve the data structure from local storage or from a remote server. The default values may be generated by a human. For example, a human metadata editor may assign values for media assets based on the content in the media asset. For example, the human editor may assign a value of 9 out of 10 to title "The Red Wedding" and a value of 3 out of 10 to actor "Kit Harrington" for a particular episode of Game of Thrones where the title is particularly well-known and/or important. The default values may also be generated based on an automated process. For example, based on querying a media aggregator for social media posts, news stories, and other published content identifying a particular media asset, the default values may be generated based on the number of times particular attributes are mentioned in connection with the media asset. The media guidance application may retrieve, from a field corresponding to each attribute of the plurality of attributes, a default score for each attribute. For example, the media guidance application may execute a database query language script, such as an SQL script, to retrieve a value (e.g., 4) for the default score for a particular attribute. The media guidance application may then adjust the default score for each attribute based on the context value and the user weighting. For example, the media guidance application may retrieve a default value (e.g., 4) for a given attribute. The media guidance application, as discussed above, may determine values to adjust the default value based on the context and the user preference (e.g., the context value and the user weighting). For example, the media guidance application may determine that the user has a negative preference for the attribute (e.g., the user does not care about the attribute) and a value of −2 is assigned, but the context value is high (e.g., 5) because a famous actor associated with the media asset has just won a major award. In this example, the media guidance application would calculate a score of 7 for the attribute (e.g., it may move up in the ranking of attributes discussed below).

The media guidance application may rank the plurality of attributes based on the score for each attribute. For example, the media guidance application may store the calculated score for each attribute as well as an identifier of each attribute in a data structure. The data structure may be a list, array, or other data structure suitable for storing the calculated scores for each attribute. The media guidance application may then sort and order the attributes based on their associated scores. For example, the media guidance application may execute a program script utilizing a bubble sort, merge sort, or other suitable sorting algorithm to order the attributes from highest score to lowest score.

The media guidance application may determine a display size of a media asset identifier associated with the media asset. For example, the media guidance application may determine that a media asset identifier that will be generated for display will be of given dimensions (e.g., pixel dimensions). The media guidance application may determine the dimensions of the media asset identifier from a display template, as described further below.

In some embodiments, the media guidance application may receive a user input corresponding to a request to generate a display with the media asset identifier. For example, the media guidance application may receive a user input (e.g., a "GUIDE" button on a remote control). The media guidance application may determine that the input corresponds to presenting a display screen (e.g., a grid-guide display with time-channel listings of media assets) to the user. The media guidance application may determine the particular media asset identifiers that need to be displayed (e.g., the default screen of the grid-guide may be to show channels 1-4 and media assets available over the next three hours from each channel) and query a media guidance data source to determine the particular media assets where information should be displayed as media asset identifiers. The media guidance application may retrieve a display template that corresponds to the user request, wherein the display template includes a plurality of display sizes associated with objects to be displayed. For example, the media guidance application may retrieve, either locally from storage or remotely from a server via a communications network, the display template. The display template may be any suitable data structure, such as a class or a table, which contains parameters for displaying media asset identifiers. The display template may contain a plurality of display sizes (e.g., pixel dimensions) for different locations where media asset identifiers will be displayed. The plurality of display sizes may further be associated with particular objects to be displayed. For example, a display size may be associated with a parameter for the length of the program. Specifically, a one hour long media asset may correspond to a different display object stored in the display template (and hence different display dimensions) than a two hour long media asset.

The media guidance application may determine that the media asset identifier associated with the media asset corresponds to a first object to be displayed. For example, the media guidance application may determine that the media asset is a one hour long media asset and corresponds to the one hour long object in the display template, which has an associated set of display dimensions. The media guidance application may retrieve, from the display template, the display size associated with the first object to be displayed. For example, the media guidance application may retrieve a stored value or values (e.g., an integer) for the display dimensions associated with the first object that matches the characteristics of the media asset.

The media guidance application may, based on the display size, determine a number of characters that fit in a display area. For example, the media guidance application may retrieve from a field of a display template corresponding to a display to be displayed (e.g., a grid-guide) that a particular object (e.g., a cell) corresponding to the media asset identifier can fit a particular number of characters (e.g., 100 characters). Alternatively or additionally, the media guidance application may determine the number of characters based on a font type (e.g., Times New Roman) to be displayed with the media asset identifier. For example, the media guidance application may access a database that stores adjustments to a stored number of default characters stored in the field of the display template (e.g., 100 characters). For example, the media guidance application may determine that a particular font type is 10% smaller, so 10% more characters can fit in the display area.

In some embodiments, the media guidance application may determine the number of characters that fit in the display area based on a font type to be displayed. Specifically, the media guidance application may determine a font type to be displayed in the display area. For example, the media guidance application may retrieve, from a stored field in a display template (e.g., as described above) an identifier of a font type. The identifier may be a string of characters (e.g., "Times") and/or any other identifier (e.g., a combination of alphanumeric characters) that can be matched to characteristics of the appropriate font type. The media guidance application may retrieve an average character size for the font type. For example, the media guidance application may retrieve the average character size from a data structure storing values for the average character size (e.g., approximately as a rectangle and in pixel dimensions such as 20×30), where each average value is associated with the identifier of the font type. The media guidance application may then compare the average character size to the display size of the media asset identifier. For example, the media guidance application may calculate, based on the average dimensions of the character of the font type (e.g., 20 pixels in height, 30 pixels in width), how many characters fit in the display dimensions. As a specific example, the media guidance application may retrieve values (e.g., from a display template) indicating that a given media asset identifier is 50 pixels in height and 900 pixels in width and compare those values to corresponding values for the dimensions of an average character of a given font type. The media guidance application may, based on comparing the average character size to the display size, determine the number of characters that fit in the display area. For example, the media guidance application may determine (e.g., by dividing the corresponding dimensions of an average character) that two rows, each with 30 characters can fit in the display. Thus, the media guidance application may determine that 60 total characters can fit in the display.

The media guidance application may select, based on the ranking, a set of attributes from the plurality of attributes, wherein the total number of characters in the set does not exceed the determined number of characters that fit in the display area. For example, the media guidance application may initialize a counter for the number of characters of attributes that are currently selected and increment the counter based on the number of characters in each attribute that is selected. As a specific example, the media guidance application may select the highest ranked attribute, which may have 30 characters, and set the counter to 30. The media guidance application may then select the next highest rated attribute and update the counter by adding the number of characters of the next highest rated attribute and so on until the counter exceeds the determined number of characters that fit in the display area. For example, once the media guidance application determines that an nth retrieved attribute exceeds the determined number of characters that fit in the display area, the media guidance application may determine that the nth-1 retrieved attribute is the last attribute that fits in the display area.

In some embodiments, the media guidance application may maximize the number of attributes the user finds interesting that are displayed. For example, even though the episode title of a media asset is the highest ranked attribute, the media guidance application may determine that because it is a large number of characters, the user would prefer to see attributes (e.g., genre and lead actor) that are ranked two and three since the user's interest in those two attributes combined is greater than the interest in the top ranked attribute alone. Specifically, the media guidance application may retrieve, from the user profile, a user display rating for each attribute type of a plurality of attribute types. For example, the media guidance application may store a data structure including a plurality of types of attributes (e.g., genre, actor, year, etc.) and a rating (e.g., on a scale of 1-10) in an associated field with each attribute type. The media guidance application may then maximize a total user display rating of attributes that are displayed. Specifically, the media guidance application may determine an attribute type for each attribute of the plurality of attributes associated with the media asset. For example, the media guidance application may determine an attribute type of each attribute of the plurality of attributes from a field associated with each attribute. For example, the plurality of attributes for the media asset may be organized in a table where each row contains an attribute (e.g., "Tom Cruise") and an associated field for the attribute type (e.g., "actor"). Alternatively or additionally, the media guidance application may determine the attribute type of an attribute by querying a media guidance data source to determine the type of the attribute. For example, the media guidance application may transmit a data packet containing the attribute, which may be compared to entries in a database at the media guidance data source mapping attributes to attribute types. The media guidance application may then compare the attribute type of the attribute to stored attribute types in the data structure with the rating for the attribute type.

The media guidance application may then determine a user display rating for each attribute of the plurality of attributes based on the respective attribute type. For example, the media guidance application may determine the user rating for each attribute of the plurality of attributes associated with the media asset based on the type of each attribute. For example, the media guidance application may determine that "Tom Cruise" is an "actor" which corresponds to a user display rating of 5, and that "action" is a "genre" which corresponds to a user display rating of 2. The media guidance application may identify attributes of the plurality of attributes that maximize the total user display rating by processing the ranked plurality of attributes with a model including both (1) the user display rating and (2) a number of characters of each attribute of the plurality of attributes. For example, the media guidance application may execute a program script that reads in the number of characters of each attribute and the user display rating associated with each attribute in order to maximize the user display rating of the set of attributes displayed. For example, the top three ranked attributes may have 80, 20, and 30 characters, respectively. The top three ranked attributes may also have user display ratings of 7, 5, and 4 respectively. In this example, the program script executed by the media guidance application may return that the attributes ranked second and third should be presented in a display area that has a maximum of 80 characters because the display rating of 9 is greater than the display rating of 7 (e.g., if only the top ranked attribute is presented, since due to its length it is the only attribute that could be presented). The media guidance application may select the identifier attributes as the set of attributes. For example, the media guidance application may determine that attributes that maximize the user display rating should be generated for display with the media asset and store the attributes as the set of attributes.

In some embodiments, the media guidance application may adjust the font of text displayed with a media asset identifier such that attributes with similar scores can both be displayed. Specifically, the media guidance application may determine, based on a number of characters of a first attribute of the ranked plurality of attributes, that the first attribute will be displayed. For example, the media guidance application may determine that there is space (e.g., there are enough characters available in the display area) to display the first attribute. As a specific example, the media guidance application may determine the first attribute can be displayed if the first attribute is 40 characters and the number of characters available in the display area is 50. The media guidance application may then determine, based on a number of characters of a second attribute of the ranked plurality of attributes, that the second attribute will not be displayed. For example, the media guidance application may determine that there is no space (e.g., there are not enough characters available in the display area) to display the second attribute. As a specific example, the media guidance application may determine that, since the first attribute will be displayed and is 40 characters and the number of characters available in the display area is now 10. If the number of characters of the second attribute is greater than 10, the media guidance application may determine that the second attribute cannot be displayed in the display area (e.g., because it won't fit).

The media guidance application may calculate a difference between a first score of the first attribute and a second score of the second attribute. For example, the media guidance application may retrieve the scores of each attribute from a data structure with attributes and associated scores calculated (e.g., as described above). As a specific example, the media guidance application may retrieve that the score for the first attribute is 7.8 and the second attribute is 7.7 and may calculate a difference of 0.1 between the scores of the two attributes. The media guidance application may determine whether the difference is below a threshold difference. For example, the media guidance application may compare the difference between the scores of two attributes (e.g., 0.1) to a threshold amount (e.g., 0.3) to determine whether the two attributes are substantially close in score to warrant both being displayed. The media guidance application may, in response to determining that the difference is below the threshold difference, adjust a font associated with the display area, wherein both the first attribute and the second attribute fit in the display area when generated for display in the adjusted font. For example, the media guidance application may adjust the font size (e.g., such that the average character size is smaller and thus more characters can fit in the display area) and/or the font type (e.g., since different font types have different average character sizes) so that both the first and the second attribute can be displayed.

The media guidance application may generate for display the media asset identifier with the set of attributes. For example, the media guidance application may generate identifiers of the attributes (e.g., strings of characters) for display in a particular section of the display corresponding to the media asset identifier. As a specific example, the media guidance application may generate for display a cell in a grid guide corresponding to the media asset identifier, where the attributes (e.g., title, genre, etc.) that were selected based on their ranking are displayed.

In some embodiments, the media guidance application may visually distinguish (e.g., using a larger font or a different color) the top rated attribute from other displayed attributes displayed with the media asset identifier. Specifically, the media guidance application may determine a first attribute of the set of attributes with a highest score. For example, based on the scores of the attributes that are part of the set, the media guidance application may determine (e.g., by comparing the set of scores corresponding to each attribute in the set) which score is the highest and the attribute that it corresponds to. The media guidance application may then generate for display the first attribute visually distinguished from other attributes in the set of attributes. For example, the media guidance application may generate the first attribute (e.g., a string of characters) with the media asset identifier in a different font, different color, different size, and/or any other visual indication that is not applied to other displayed attributes. In this manner, the media guidance application may highlight a particular attribute as being important (e.g., based on the context and/or user preference). In some embodiments, specific colors, fonts, etc. may be used by the media guidance application to indicate to the user that the user has a preference for the particular attribute. For example, if a user has watched a plurality of media assets with "Tom Cruise," based on the user's viewing history as described above, then the media guidance application may display "Tom Cruise" in a different font color to indicate to the user that the user has a preference for "Tom Cruise."

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for presenting targeted metadata associated with media asset identifiers. For example, based on stored user preferences (e.g., the user likes a particular actor) and context (e.g., whether an actor is trending on social media near the user's location), the systems and methods may rank attributes associated with the media asset (e.g., title, actors, director, genre, etc.). The systems and methods may then determine a number of attributes that can be displayed based on a size of the media asset identifier (e.g., a cell in a grid-guide). The systems and methods may then select the number of attributes that can be displayed based on the ranking (e.g., if two attributes can fit in a cell of a grid-guide, then the top two ranked attributes may be selected). The systems and methods then display the media asset identifier (e.g., the cell in the grid-guide) with the selected attributes.

Figure 1:
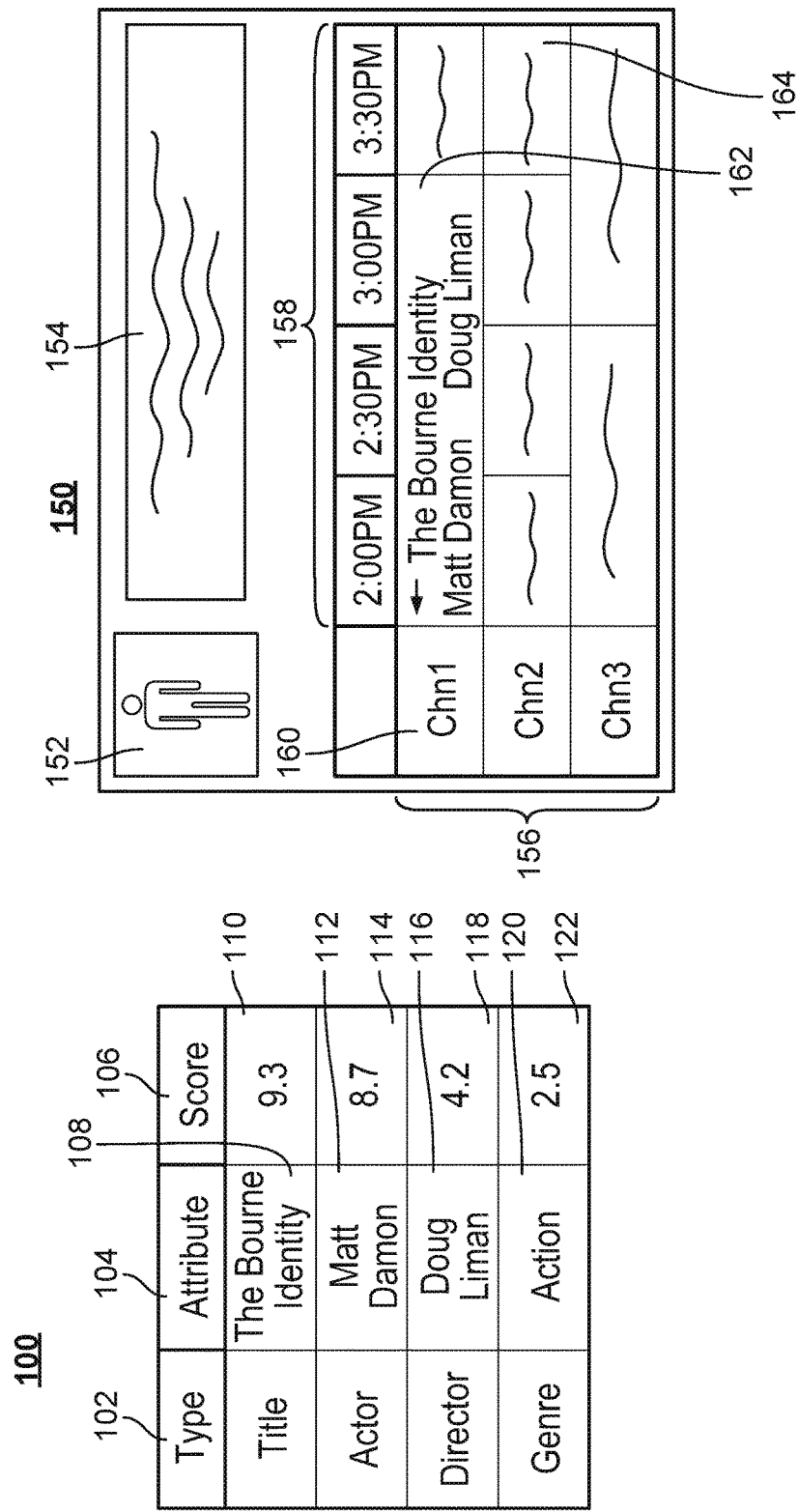
FIG. 1 shows an illustrative example of a system presenting targeted metadata with media asset identifiers, in accordance with some embodiments of the disclosure.

FIG. 1 shows an illustrative example of a system a system presenting targeted metadata with media asset identifiers, in accordance with some embodiments of the disclosure. For example, data structure 100 may store attributes 104, along with associated types 102 and scores 106 for each attribute of attributes 104. Attributes 104 may be ranked according to an assigned score (e.g., scores 106 are ordered from highest to lowest), calculated based on the context of each attribute and user preference for each attribute, as described further below. For example, attribute 108 may be ranked higher than attribute 112, as score 110 associated with attribute 108 may be greater than score 114 associated with attribute 112. Similarly, attribute 112 may be ranked higher than attribute 116, as score 114 associated with attribute 112 may be greater than score 118 associated with attribute 116. Similarly, attribute 116 may be ranked higher than attribute 120, as score 118 associated with attribute 116 may be greater than score 122 associated with attribute 120. Data structure 100 may be stored on one or more user devices (e.g., any of the devices listed in FIGS. 5-6 below). Moreover, the media guidance application may use one or more of the processes described in FIGS. 7-10 to generate data structure 100 or any of the features described therein.

Data structure 100 may be used by the media guidance application to determine which attributes to display with media asset identifiers when generating display 150. For example, display 150 includes preview window 152, which may show live video and/or audio associated with a currently selected channel. Display 150 also may include synopsis window 154, which may provide further information relating to a highlighted and/or selected program (e.g., in a time-channel grid-guide). Display 150 may include a grid-guide displaying media asset identifiers. For example, channels 156 and time segments 158 may respectively form rows and columns organizing media asset identifiers. For example, channel identifier 160 during three time segments may correspond to a particular media asset, for which media asset identifier 162 is displayed. Media asset identifier 162 may display attributes 108, 112, and 116 based on the ranking in data structure 100. The size of media asset identifiers may vary based on the number of time segments that the media asset encompasses, e.g., media asset identifier 162 is a different size than media asset identifier 164. Display 150 may appear on one or more user devices (e.g., any of the devices listed in FIGS. 5-6 below). Moreover, the media guidance application may use one or more of the processes described in FIGS. 7-10 to generate display 150 or any of the features described therein.

In some embodiments, the media guidance application may retrieve a plurality of attributes associated with a media asset. For example, the media guidance application may retrieve the plurality of attributes (e.g., attributes 104) from local storage or a remote server (e.g., from a media guidance database). For example, the media guidance application may transmit a query including an identifier of the media asset to a database including a plurality of attributes associated with media assets. Based on the transmitted query, the media guidance application may receive the plurality of attributes (e.g., attributes 104) associated with the media asset (e.g., in data structure 100). As a specific example, the database may contain a plurality of tables, where each table is associated with a media asset, and each row of each table contains an attribute associated with the media asset. The row may also include a type of each attribute in another associated field (e.g., "actor"). The identifier of the media asset may be any combination of characters that are unique to the media asset. For example, the identifier may be the title of the media asset, or a number assigned by a content provider.

As referred to herein, an "attribute" refers to any defining feature of a media asset. For example, the feature may be a human who worked on the media asset in some capacity, such as a director, actor, actress, producer, composer, animator, stage manager, or any other person involved with making the media asset. As another example, the feature may be related to the subject matter of the media asset, such as a keyword, title, plot summary or portion of a plot summary. As another example, the feature may be related to the release of the media asset, such as the year it was released, the box office earnings, awards, etc.

The media guidance application may generate a score for each attribute of the plurality of attributes. For example, the media guidance application may assign a numerical value (e.g., scores 106) to each attribute of the plurality of attributes (e.g., attributes 104) indicating how relevant the attribute is to the user given the user's preferences and context of the attribute. Specifically, when generating the score, the media guidance application may determine, based on a current time and a location of a user, a context for each attribute (e.g., attributes 108, 112, 116, and 120). For example, the context may be any one or combination of the current season (e.g., Christmas time), the current time (e.g., afternoon), the user's location (e.g., Ohio). For example, the media guidance application may determine the current time based on a current clock time. The media guidance application may determine the location based on GPS coordinates of a device of the user and/or based on entry of the location by the user. For example, the media guidance application may prompt the user to enter his or her current location via a user input device. The media guidance application may then compare the determined location and current time to a data structure that maps attributes and/or attribute types to current times and/or locations. For example, the data structure may be a table where each row contains a range of times and/or locations that correspond to a given context. For example, the context "Christmas" may correspond to December $1^{st}$ to $30^{th}$ in North America and Europe. The data structure may, for each context, include an indication of which types of attributes (e.g., genre, actor, etc.) or specific attributes (e.g., "Christmas movie") correspond to the context. Thus, if a particular attribute associated with a media asset is that the media asset is a "Christmas movie," the context "Christmas" may be assigned if the time determined was December $10^{th}$ and the location was Ohio. The media guidance application may generate a list or other data structure with a plurality of fields for the plurality of attributes each with associated fields for the context. For example, the media guidance application may execute a program script that iteratively writes a context to each field associated with each attribute (e.g., by determining whether the current time and/or location are associated with an attribute as discussed above).

In some embodiments, the media guidance application may transmit, to a social media website, the current time and location. For example, the media guidance application may transmit a data packet including a data structure with the value for the current time (e.g., an integer or series of integers) and location (e.g., GPS coordinate or a string of text identifying the location such as "Ohio"). The social media website may contain a data structure with currently relevant (e.g., "trending") topics. For example, the topics may be relevant because they are the topics that the most people in a given location at a given time are posting about. The media guidance application may receive, from the social media website, a data structure including a plurality of topics at the current time and the location. For example, the media guidance application may receive a table with a plurality of entries, each associated with a topic that is currently relevant at the current time and the location of the user. As an example, the user may be located in New York City and it may be New Year's Eve. The media guidance application may receive, from the social media website, a table with entries for topics such as "Ball drop," "NYE 2016," "Resolutions," etc. The entries in the table may include the text that summarizes the topic (e.g., the word "Resolutions" appears in many posts) and/or may be based on tags, such as hashtags (e.g., #resolutions).

The media guidance application may then compare each attribute (e.g., attributes 104) to each topic of the plurality of topics received from the social media website. For example, the media guidance application may execute a program script utilizing a for-loop and retrieve the value (e.g., the string of characters defining each topic) from the table received from the social media website. The media guidance application may compare the characters of each retrieved topic with characters of each attribute (e.g., attributes 108, 112, 116, and 120) to determine whether a given attribute is relevant (e.g., trending). The media guidance application may identify, based on the comparison, that a first subset of the plurality of attributes associated with the media asset each correspond to a respective topic of the plurality of topics. For example, the media guidance application may identify a subset of the plurality of attributes associated with the media asset that do correspond to topics in the table received from the social media website. For example, many users in New York City may be posting about "car chase" and "Matt Damon," and the table received from the social media website may contain entries for those two topics. The media guidance application may determine that the "car chase" and "Matt Damon" match attributes associated with the movie "The Bourne Identity" for which a media asset identifier is to be displayed. The media guidance application may determine the context for each attribute in the first subset based on the corresponding topic of the plurality of topics. For example, the context may be that the topic matches the exact text of the attribute (e.g., "Matt Damon" matches the exact text of attribute 112). As another example, the topic may not match the text of the attribute, but may match a category or otherwise be associated with the attribute. For example, the media guidance application may determine that a topic in the data structure received from the media guidance application is "sports," which is related to but not equivalent to "New York Knicks." The media guidance application may determine that the attribute is related to a topic based on a stored rule-set. For example, for the location "New York," the media guidance application may access a "New York" database that includes categories (e.g., sports) and teams (e.g., "Knicks"), locations ("Madison Square Garden") etc. associated with the category to determine that an attribute is related to a topic.

In some embodiments, the media guidance application may compare the current time and the location of the user to a plurality of current times and locations stored in a database. For example, the media guidance application may access the database locally in storage or at a remote server. The database may be structured as a table where each row in the table includes fields with a time or range of times and location or range of locations and corresponding fields with context mappings. For example, from October 20$^{th}$ to October 31$^{st}$ in North America may correspond to context mapping, "Halloween." The media guidance application may determine that the current time and location of the user matches a stored time and a stored location in the database. For example, the media guidance application may compare the values for the current time and the location of the user to values stored in the database to determine a match. The media guidance application may then retrieve, from a field associated with the matched stored time and the matched stored location, a context mapping for attributes. For example, the media guidance application may determine that a user in "Ohio" on October 27$^{th}$ fulfills both criterions to be considered in the "Halloween" context mapping and retrieves an identifier (e.g., "Halloween") from the field associated with the context mapping.

The media guidance application may then process each attribute of the plurality of attributes associated with the media asset (e.g., attributes 104) with the context mapping for attributes. For example, the media guidance application may access another database or another row in the same database (e.g., linked via a pointer) which includes attributes that the context mapping is applicable to. For example, the "Halloween" context mapping may be relevant to attributes, "ghost movie," "scary movie," "Dracula," etc. The media guidance application may then process the attributes associated with the media asset to determine whether they match the attributes identified as relating to the context mapping. For example, a movie with an attribute "The Bourne Identity" (e.g., attribute 108) may not match one of the attributes associated with a "Halloween" context mapping. Thus, the media guidance application may not assign that attribute a context. Another attribute, such as, "Doug Liman" associated with the media asset may match one of the attributes associated with the context mapping, which may result in a higher ranking for the attribute (e.g., attribute 116) than at other times of the year. The media guidance application may process the context to determine a context value (e.g., which can be used to rank the attributes as seen in data structure 100), as described further below.

The media guidance application may, when generating the score, determine, from a user profile associated with the user, a user preference for each attribute. For example, the media guidance application may retrieve a user profile associated with the user from local storage or from a remote server. The media guidance application may then retrieve stored characteristics and preferences of the user from the user profile. For example, the media guidance application may retrieve a viewing history of the user and determine common attributes (e.g., indicating that the user has a preference for the attribute). As a specific example, the media guidance application may determine from a viewing history for the user that the user has watched seven movies with "Matt Damon," and thus the user has a preference for Matt Damon movies (e.g., which matches attribute 112 of the media asset). The media guidance application may analyze a threshold amount of time (e.g., one month) from the current time. For example, the media guidance application may determine that over the past week the user has viewed multiple movies of the "action" genre (e.g., which matches attribute 120 of the media asset). The media guidance application may determine that an attribute is a common attribute if the attribute appears a threshold number of times in the user's viewing history (e.g., four times). The media guidance application may determine a preference from an explicit indication from the user (e.g., a stored list of attributes the user likes). For example, the media guidance application may store a list of attributes (e.g., actors) that the user has indicated that they like. Alternatively or additionally, the media guidance application may store a relative amount that the user likes a given attribute (e.g., 10/10). The media guidance application may generate for display a graphical user interface allowing the user to input (e.g., via a user input interface) attributes that the user is interested in (e.g., the user may input, "Matt Damon" via a keyboard). The media guidance application may generate a list or other data structure with a plurality of fields for the plurality of attributes each with associated fields for the user preference. For example, the media guidance application may execute a program script that iteratively writes a context to each field associated with each attribute (e.g., attributes 104).

In some embodiments, the media guidance application may retrieve the user profile. For example, the media guidance application may retrieve the user profile from local storage or a remote server (e.g., via a communications network). The user profile may be any suitable data structure for storing preferences and data relating to the user. For example the user profile may be a table or series of tables (e.g., linked via pointers). The media guidance application may retrieve user preferences for the user from the user profile. For example, the media guidance application may execute an SQL script (e.g., utilizing the "Select" statement) to retrieve data from particular fields in the user profile. The media guidance application may compare each attribute to each user preference of the user preferences. For example, the media guidance application may compare each retrieved user preference with each attribute of the plurality of attributes associated with the media asset (e.g., attributes 104). For example, the media guidance application may compare the characters of the user preference and the characters of a particular attribute to determine whether they match. As a specific example, the media guidance application may determine that a user preference for the actor, "Matt Damon" matches an attribute "Matt Damon" (e.g., attribute 112 stored in data structure 100) associated with the media asset "The Bourne Identity." The media guidance application may identify, based on comparing each attribute to each user preference of the user preferences, that a second subset of the plurality of attributes associated with the media asset each correspond to a respective user preference of the user preferences. For example, the media guidance application may determine the subset of the plurality of attributes that match a user preference stored in the user profile. The media guidance application may then determine the user preference for each attribute in the second subset based on the corresponding user preference of the user preferences. For example, the media guidance application may generate a list or other data structure including an identifier of each attribute of the second subset and an indication that the attribute matched a user preference. In some embodiments, the media guidance application may additionally store a type of user preference matched (e.g., based on a viewing history or a user favorite actors list etc.).

The media guidance application may, when generating the score, assign both (1) a context value to each attribute based on the context and (2) a user weighting to each attribute based on the user preference. For example, the media guidance application may retrieve a list or other data structure with a plurality of fields for the plurality of attributes (e.g., attributes 104) each with associated fields for the context and the user preference. The media guidance application may process the list or other data structure (e.g., by reading in strings of text or values corresponding to the context and the user preference for each attribute). The media guidance application may then assign a context value based on an algorithm mapping the context value and the user weighting for each attribute to a numerical score. For example, if the time is December $10^{th}$, which corresponds to a context of Christmas time and an attribute of a media asset is that it is a "Christmas movie," the media guidance application may assign a higher score to the "Christmas movie" attribute than it would at a different time of year (e.g., Summer). The media guidance application may similarly assign a user weighting based on the user preference. For example, the media guidance application may assign a greater user weighting to an attribute (e.g., "Matt Damon") that matches a user preference than one that does not. For example, the exact value of the user weighting may depend on a relative amount that the user likes the attribute (e.g., a stored user preference for an attribute of 5/10 may correspond to a lower weighting than 8/10). As another example, the exact value of the user weighting may depend on the number of times a user has viewed media assets associated with the attribute (e.g., if a user has watched two movies with "Matt Damon" the weighting may be lower than if the user has watched ten movies with "Matt Damon"). The media guidance application may assign the context value and/or the user weighting based on a rule-set mapping contexts and/or user weightings to particular values. In some embodiments, the values may be positive or negative and may correspond to adjustments from default values for the attributes, as discussed further below.

The media guidance application may, when generating the score, calculate the score based on the context value for each attribute and the user weighting for each attribute. For example, the media guidance application may combine the user weighting and the context value to generate a single composite score (e.g., scores 106) for each attribute (e.g., attributes 104). As a specific example, if the scores are based on a ten point scale, and the context value is 4 and the user weighting is 4, the media guidance application may calculate a value of 8. In some embodiments, the media guidance application adjusts default values (e.g., which may be set to the same value, or set to specific values that are different for each attribute) based on the calculated score. For example, if the default score is 5 and the media guidance application determines that the context value is −1 and the user weighting is +3 for a given attribute, the media guidance application may calculate a score of 7 for the attribute.

In some embodiments, the media guidance application may calculate the score by adjusting default scores for attributes. Specifically, the media guidance application may retrieve a data structure with default scores for the plurality of attributes associated with the media asset. For example, the media guidance application may retrieve the data structure from local storage or from a remote server. The default values may be generated by a human. For example, a human metadata editor may assign values for attributes associated with media assets (e.g., attributes 104) based on the content in the media asset. For example, the human editor may assign a value of 9 out of 10 to title "The Red Wedding" and a value of 3 out of 10 to actor "Kit Harrington" for a particular episode of Game of Thrones where the title is particularly well-known and/or important. The default values may also be generated based on an automated process. For example, based on querying a media aggregator for social media posts, news stories, and other published content identifying a particular media asset, the default values may be generated based on the number of times particular attributes are mentioned in connection with the media asset. The media guidance application may retrieve, from a field corresponding to each attribute of the plurality of attributes, a default score for each attribute. For example, the media guidance application may execute a database query language script, such as an SQL script, to retrieve a value (e.g., 4) for the default score for a particular attribute. The media guidance application may then adjust the default score for each attribute based on the context value and the user weighting. For example, the media guidance application may retrieve a default value (e.g., 4) for a given attribute (e.g., attribute 120). The media guidance application, as discussed above, may determine values to adjust the default value based on the context and the user preference (e.g., the context value and the user weighting). For example, the media guidance application may determine that the user has a negative preference for the attribute (e.g., the user does not care about the attribute) and a value of −2 is assigned, but the context value is high (e.g., 5) because a famous actor associated with the media asset has just won a major award. In this example, the media guidance application would calculate an score of 7 for the attribute (e.g., it may move up in the ranking of attributes discussed below).

The media guidance application may rank the plurality of attributes based on the score for each attribute. For example, the media guidance application may store the calculated score (e.g., scores 106) for each attribute (e.g., attributes 104) as well as an identifier of each attribute in a data structure. The data structure may be a list, array, or other data structure suitable for storing the calculated scores for each attribute. The media guidance application may then sort and order the attributes based on their associated scores (e.g., data structure 100 orders attributes 104 from highest score 110 to lowest score 122). For example, the media guidance application may execute a program script utilizing a bubble sort, merge sort, or other suitable sorting algorithm to order the attributes from highest score to lowest score.

The media guidance application may determine a display size of a media asset identifier associated with the media asset. For example, the media guidance application may determine that a media asset identifier (e.g., media asset identifier 162) that will be generated for display will be of given dimensions (e.g., pixel dimensions). The media guidance application may determine the dimensions of the media asset identifier from a display template, as described further below.

In some embodiments, the media guidance application may receive a user input corresponding to a request to generate a display with the media asset identifier. For example, the media guidance application may receive a user input (e.g., a "GUIDE" button on a remote control). The media guidance application may determine that the input corresponds to presenting a display screen (e.g., display 150) to the user. The media guidance application may determine the particular media asset identifiers that need to be displayed (e.g., display 150 includes channels 156 at time segments 158, for which specific media asset identifiers, such as media asset identifier 162 need to be displayed) and query a media guidance data source to determine the particular media assets where information should be displayed as media asset identifiers. The media guidance application may retrieve a display template that corresponds to the user request, wherein the display template includes a plurality of display sizes associated with objects to be displayed. For example, the media guidance application may retrieve, either locally from storage or remotely from a server via a communications network, the display template (e.g., for display 150). The display template may be any suitable data structure, such as a class or a table, which contains parameters for displaying media asset identifiers. The display template may contain a plurality of display sizes (e.g., pixel dimensions) for different locations where media asset identifiers will be displayed. The plurality of display sizes may further be associated with particular objects to be displayed (e.g., media asset identifiers 162 and 164, which are for media assets of different lengths, correspond to different objects with different display sizes). For example, a display size may be associated with a parameter for the length of the program. Specifically, a one hour long media asset may correspond to a different display object stored in the display template (and hence different display dimensions) than a two hour long media asset.

The media guidance application may determine that the media asset identifier associated with the media asset corresponds to a first object to be displayed. For example, the media guidance application may determine that the media asset is a half hour long media asset and corresponds to the half hour long object in the display template, which has an associated set of display dimensions (e.g., media asset identifier 164 is displayed based on the half hour long object in the display template). The media guidance application may retrieve, from the display template, the display size associated with the first object to be displayed. For example, the media guidance application may retrieve a stored value or values (e.g., an integer) for the display dimensions associated with the first object that matches the characteristics of the media asset.

The media guidance application may, based on the display size, determine a number of characters that fit in a display area. For example, the media guidance application may retrieve from a field of a display template corresponding to a display (e.g., display 150) to be displayed (e.g., a gridguide) that a particular object (e.g., a cell) corresponding to the media asset identifier (e.g., media asset identifier 162) can fit a particular number of characters (e.g., 100 characters). Alternatively or additionally, the media guidance application may determine the number of characters based on a font type (e.g., Times New Roman) to be displayed with the media asset identifier (e.g., media asset identifier 162). For example, the media guidance application may access a database that stores adjustments to a stored number of default characters stored in the field of the display template (e.g., 100 characters). For example, the media guidance application may determine that a particular font type is 10% smaller, so 10% more characters can fit in the display area.

In some embodiments, the media guidance application may determine the number of characters that fit in the display area (e.g., a portion of media asset identifier 162 where text is displayed) based on a font type to be displayed. Specifically, the media guidance application may determine a font type to be displayed in the display area. For example, the media guidance application may retrieve, from a stored field in a display template (e.g., as described above) an identifier of a font type. The identifier may be a string of characters (e.g., "Times") and/or any other identifier (e.g., a combination of alphanumeric characters) that can be matched to characteristics of the appropriate font type. The media guidance application may retrieve an average character size for the font type. For example, the media guidance application may retrieve the average character size from a data structure storing values for the average character size (e.g., approximately as a rectangle and in pixel dimensions such as 20×30), where each average value is associated with the identifier of the font type. The media guidance application may then compare the average character size to the display size of the media asset identifier (e.g., media asset identifier 162 or 164). For example, the media guidance application may calculate, based on the average dimensions of the character of the font type (e.g., 20 pixels in height, 30 pixels in width), how many characters fit in the display dimensions. As a specific example, the media guidance application may retrieve values (e.g., from a display template) indicating that a given media asset identifier is 50 pixels in height and 900 pixels in width and compare those values to corresponding values for the dimensions of an average character of a given font type. The media guidance application may, based on comparing the average character size to the display size, determine the number of characters that fit in the display area. For example, the media guidance application may determine (e.g., by dividing the corresponding dimensions of an average character) that two rows, each with 30 characters can fit in the display. Thus, the media guidance application may determine that 60 total characters can fit in the display.

The media guidance application may select, based on the ranking, a set of attributes from the plurality of attributes, wherein the total number of characters in the set does not exceed the determined number of characters that fit in the display area. For example, the media guidance application may initialize a counter for the number of characters of attributes that are currently selected and increment the counter based on the number of characters in each attribute that is selected. As a specific example, the media guidance application may select the highest ranked attribute (e.g., attribute 108), which may have 19 characters, and set the counter to 19. The media guidance application may then select the next highest rated attribute (e.g., attribute 112) and update the counter by adding the number of characters of the next highest rated attribute and so on until the counter exceeds the determined number of characters that fit in the display area. For example, once the media guidance application determines that an nth retrieved attribute exceeds the determined number of characters that fit in the display area, the media guidance application may determine that the nth-1 retrieved attribute is the last attribute that fits in the display area.

In some embodiments, the media guidance application may adjust the font of text displayed with a media asset identifier (e.g., media asset identifier 162) such that attributes with similar scores can both be displayed. Specifically, the media guidance application may determine, based on a number of characters of a first attribute of the ranked plurality of attributes, that the first attribute will be displayed. For example, the media guidance application may determine that there is space (e.g., there are enough characters available in the display area) to display the first attribute (e.g., attribute 112). As a specific example, the media guidance application may determine the first attribute can be displayed if the first attribute is 40 characters and the number of characters available in the display area is 50. The media guidance application may then determine, based on a number of characters of a second attribute of the ranked plurality of attributes, that the second attribute will not be displayed. For example, the media guidance application may determine that there is not space (e.g., there are not enough characters available in the display area) to display the second attribute (e.g., attribute 116). As a specific example, the media guidance application may determine that, since the first attribute will be displayed and is 40 characters and the number of characters available in the display area is now 10. If the number of characters of the second attribute is greater than 10, the media guidance application may determine that the second attribute cannot be displayed in the display area (e.g., because it won't fit).

The media guidance application may calculate a difference between a first score of the first attribute and a second score of the second attribute. For example, the media guidance application may retrieve the scores of each attribute (e.g., score 114 of attribute 112 and score 118 of attribute 116) from a data structure with attributes and associated scores calculated (e.g., as described above). As a specific example, the media guidance application may retrieve that the score for the first attribute is 7.8 and the second attribute is 7.7 and may calculate a difference of 0.1 between the scores of the two attributes. The media guidance application may determine whether the difference is below a threshold difference. For example, the media guidance application may compare the difference between the scores of two attributes (e.g., 0.1) to a threshold amount (e.g., 0.3) to determine whether the two attributes are substantially close in score to warrant both being displayed. The media guidance application may, in response to determining that the difference is below the threshold difference, adjust a font associated with the display area, wherein both the first attribute and the second attribute fit in the display area when generated for display in the adjusted font. For example, the media guidance application may adjust the font size (e.g., such that the average character size is smaller and thus more characters can fit in the display area) and/or the font type (e.g., since different font types have different average character sizes) so that both the first and the second attribute can be displayed (e.g., with media asset identifier 162 on display 150).

The media guidance application may generate for display the media asset identifier with the set of attributes. For example, the media guidance application may generate identifiers of the attributes (e.g., strings of characters of attributes 104) for display in a particular section of the display (e.g., display 150) corresponding to the media asset identifier (e.g., media asset identifier 162). As a specific example, the media guidance application may generate for display a cell in a grid guide corresponding to the media asset identifier, where the attributes (e.g., title, genre, etc.) that were selected based on their ranking are displayed. As referred to herein, "a media asset identifier" refers to any graphics, text, or other data describing a media asset. In some embodiments, the media asset identifier may identify a series of media assets. In other embodiments, the media asset identifier may identify a movie, podcast, news article, or other form of consumable media content such that a user can recognize the content.

In some embodiments, the media guidance application may visually distinguish (e.g., using a larger font or a different color) the top rated attribute from other displayed attributes displayed with the media asset identifier. Specifically, the media guidance application may determine a first attribute of the set of attributes (e.g., attributes 104) with a highest score (e.g., attribute 108 has highest score 110). For example, based on the scores of the attributes that are part of the set, the media guidance application may determine (e.g., by comparing the set of scores corresponding to each attribute in the set) which score is the highest and the attribute that it corresponds to. The media guidance application may then generate for display the first attribute (e.g., attribute 108) visually distinguished from other attributes (e.g., attributes 112 and 116) in the set of attributes. For example, the media guidance application may generate the first attribute (e.g., a string of characters) with the media asset identifier in a different font, different color, different size, and/or any other visual indication that is not applied to other displayed attributes. In this manner, the media guidance application may highlight a particular attribute as being important (e.g., based on the context and/or user preference). In some embodiments, specific colors, fonts, etc. may be used by the media guidance application to indicate to the user that the user has a preference for the particular attribute. For example, if a user has watched a plurality of media assets with "Tom Cruise," based on the user's viewing history as described above, then the media guidance application may display "Tom Cruise" in a different font color to indicate to the user that the user has a preference for "Tom Cruise."

Figure 2:
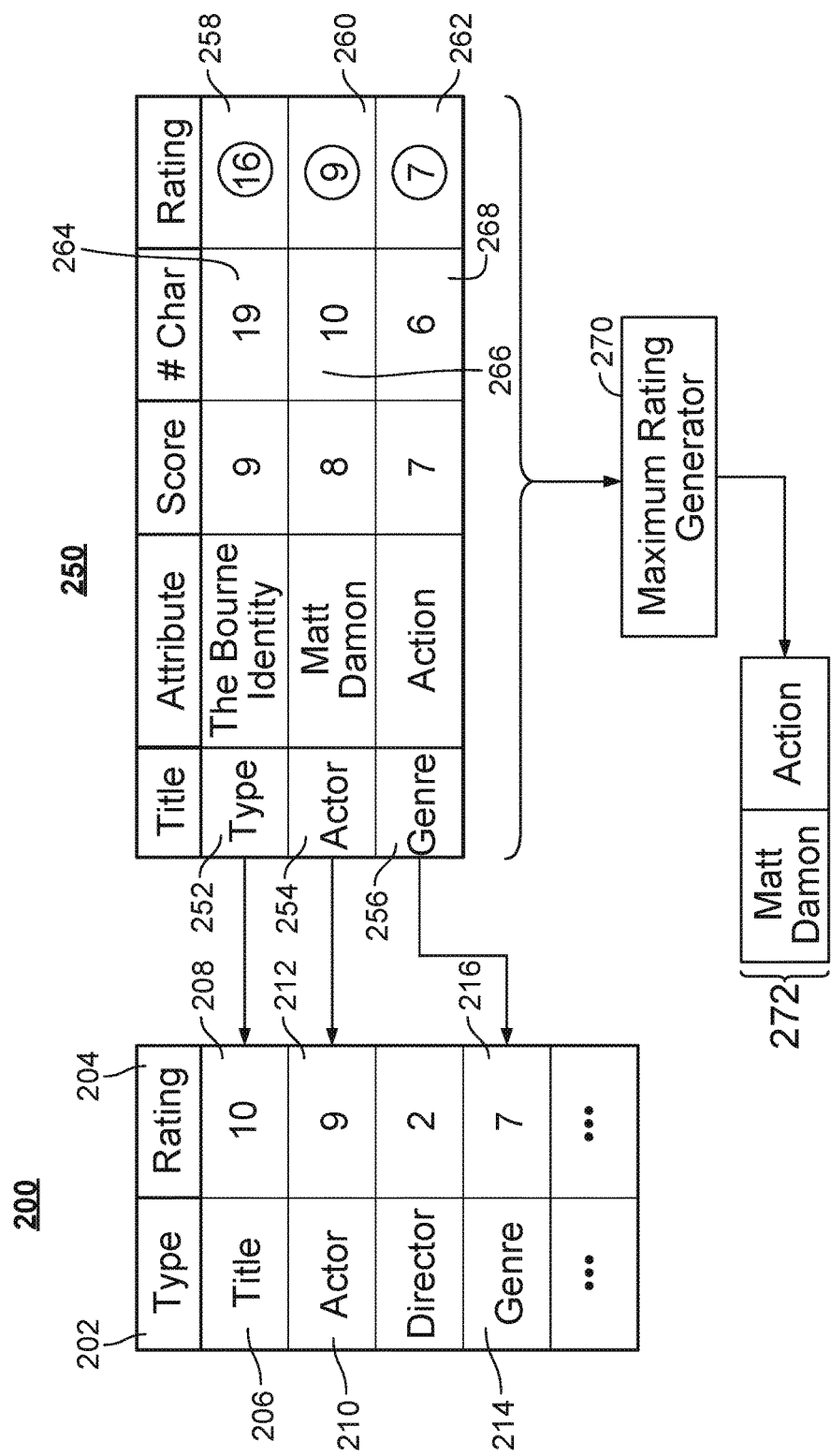
FIG. 2 shows another illustrative example of a system presenting targeted metadata with media asset identifiers, in accordance with some embodiments of the disclosure.

FIG. 2 shows another illustrative example of a system a system presenting targeted metadata with media asset identifiers, in accordance with some embodiments of the disclosure. For example, data structure 200 may store attribute types 202 and ratings 204 associated with each attribute type. Attribute types may include "title" (e.g., type 206), "actor" (e.g., type 210), and "genre" (e.g., type 214). Type 206 may be associated with rating 208. Similarly, type 210 may be associated with rating 212, and type 214 may be associated with rating 216. The media guidance application may use the user's preference (e.g., ratings 204) for certain attribute types (e.g., of attribute types 202) to determine which attributes to display.

The media guidance application may generate data structure 250, which may contain a plurality of parameters associated with attributes of a media asset. The media guidance application may determine a number of characters (e.g., number of characters 264, 266, and 268) associated with each attribute. The media guidance application may also determine a type (e.g., type 252, 254, and 256) associated with each attribute. The media guidance application may match each type in data structure 250 to a type in data structure 200 in order to determine a rating for each attribute type (e.g., rating 258, 260, and 262). The ratings, number of characters, and scores for the attributes may be input to maximum rating generator 270, which determines the attributes that can be displayed in a display area (e.g., based on the number of characters). The maximum rating generator may also weigh the score (e.g., based on the user preference and context for each attribute as described above with respect to FIG. 1) when determining which attributes to display. As a specific example, if the display size fits 20 characters, either attribute 252 alone can be displayed, or both attributes 254 and 256 can be displayed. Since rating 258 is less than the combined rating of ratings 260 and 262, the maximum rating generator outputs set of attributes 272 comprising attributes 254 and 256 as the attributes to display. Data structures 200 and 250 may be stored on one or more user devices (e.g., any of the devices listed in FIGS. 5-6 below). Moreover, the media guidance application may use one or more of the processes described in FIGS. 7-10 to generate data structures 200 and 250 or any of the features described therein.

In some embodiments, the media guidance application may maximize the number of attributes the user finds interesting that are displayed. For example, even though the episode title of a media asset is the highest ranked attribute, the media guidance application may determine that because it is a large number of characters (e.g., number of characters 264), the user would prefer to see attributes (e.g., genre and actor) that are ranked two and three since the user's interest in those two attributes combined (e.g., ratings 260 and 262) is greater than the interest in the top ranked attribute alone (e.g., rating 258). Specifically, the media guidance application may retrieve, from the user profile, a user display rating for each attribute type of a plurality of attribute types. For example, the media guidance application may store a data structure (e.g., data structure 200) including a plurality of types of attributes (e.g., attribute types 202) and a rating (e.g., ratings 204, which may be on a scale of 1-10) in an associated field with each attribute type. The media guidance application may then maximize a total user display rating of attributes that are displayed. Specifically, the media guidance application may determine an attribute type for each attribute of the plurality of attributes associated with the media asset. For example, the media guidance application may determine an attribute type (e.g., attribute type 252, 254, or 256) of each attribute of the plurality of attributes from a field associated with each attribute. For example, the plurality of attributes for the media asset may be organized in a table (e.g., data structure 250) where each row contains an attribute (e.g., "Tom Cruise") and an associated field for the attribute type (e.g., "actor"). Alternatively or additionally, the media guidance application may determine the attribute type of an attribute by querying a media guidance data source to determine the type of the attribute. For example, the media guidance application may transmit a data packet containing the attribute, which may be compared to entries in a database at the media guidance data source mapping attributes to attribute types. The media guidance application may then compare the attribute type of the attribute to stored attribute types in the data structure with the rating for the attribute type (e.g., attribute type 252 is compared to attribute types 202 in data structure 200).

The media guidance application may then determine a user display rating for each attribute of the plurality of attributes based on the respective attribute type. For example, the media guidance application may determine the user rating (e.g., rating 258, 260, and 262) for each attribute of the plurality of attributes associated with the media asset based on the type (e.g., type 252, 254, and 256) of each attribute. For example, the media guidance application may determine that "Tom Cruise" is an "actor" which corresponds to a user display rating of 5, and that "action" is a "genre" which corresponds to a user display rating of 2. The media guidance application may identify attributes of the plurality of attributes that maximize the total user display rating by processing the ranked plurality of attributes with a model (e.g., maximum rating generator 270) including both (1) the user display rating and (2) a number of characters of each attribute of the plurality of attributes. For example, the media guidance application may execute a program script that reads in the number of characters of each attribute and the user display rating associated with each attribute in order to maximize the user display rating of the set of attributes displayed. For example, the top three ranked attributes may have 80, 20, and 30 characters, respectively. The top three ranked attributes may also have user display ratings of 7, 5, and 4 respectively. In this example, the program script executed by the media guidance application may return that the attributes ranked second and third (e.g., set of attributes 272) should be presented in a display area that has a maximum of 80 characters because the display rating of 9 is greater than the display rating of 7 (e.g., if only the top ranked attribute is presented, since due to its length it is the only attribute that could be presented). The media guidance application may select the identifier attributes as the set of attributes. For example, the media guidance application may determine that attributes that maximize the user display rating should be generated for display with the media asset and store the attributes as the set of attributes.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
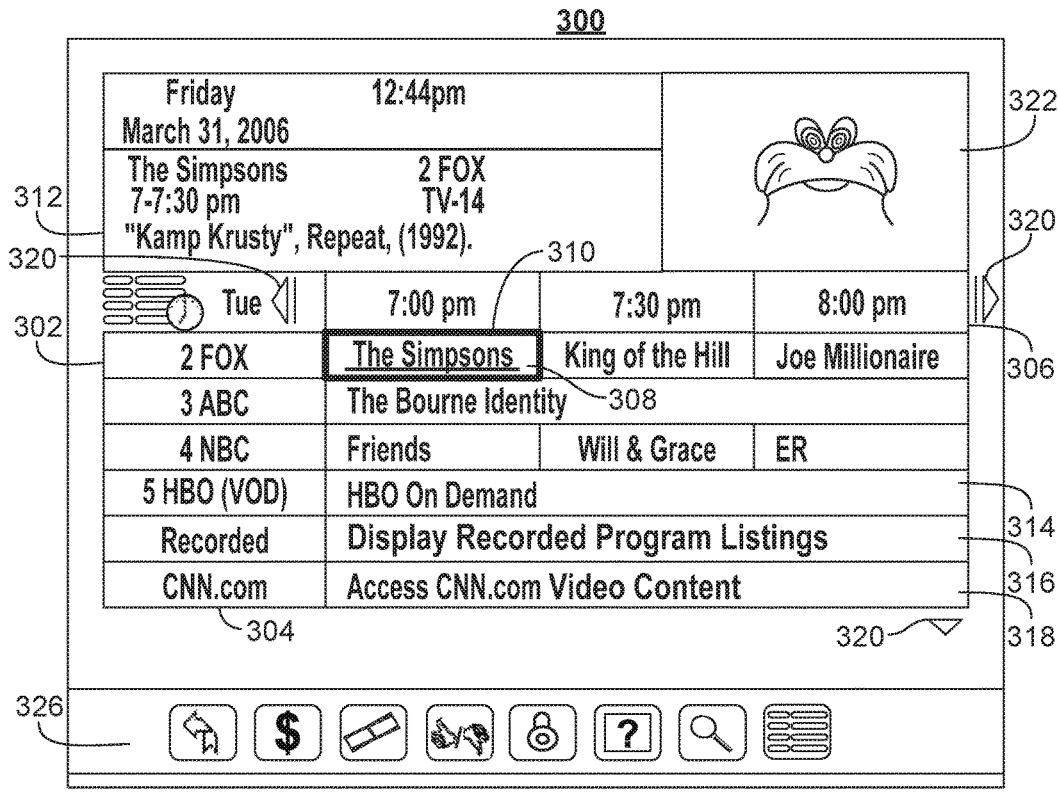
FIG. 3 shows an illustrative example of a display screen for use in accessing media content in accordance with some embodiments of the disclosure.
Figure 4:
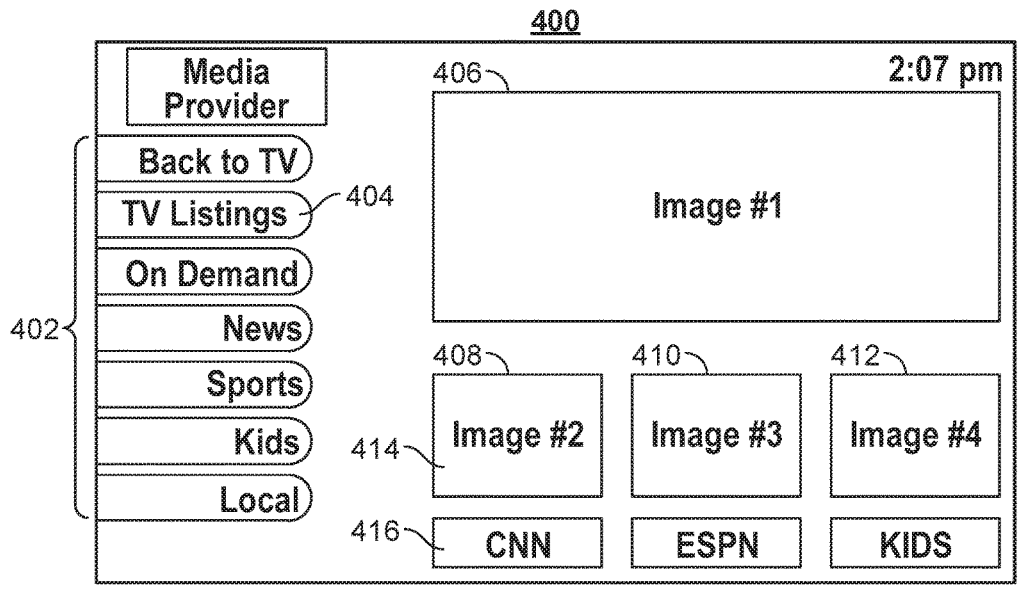
FIG. 4 shows another illustrative example of a display screen for use in accessing media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listings associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
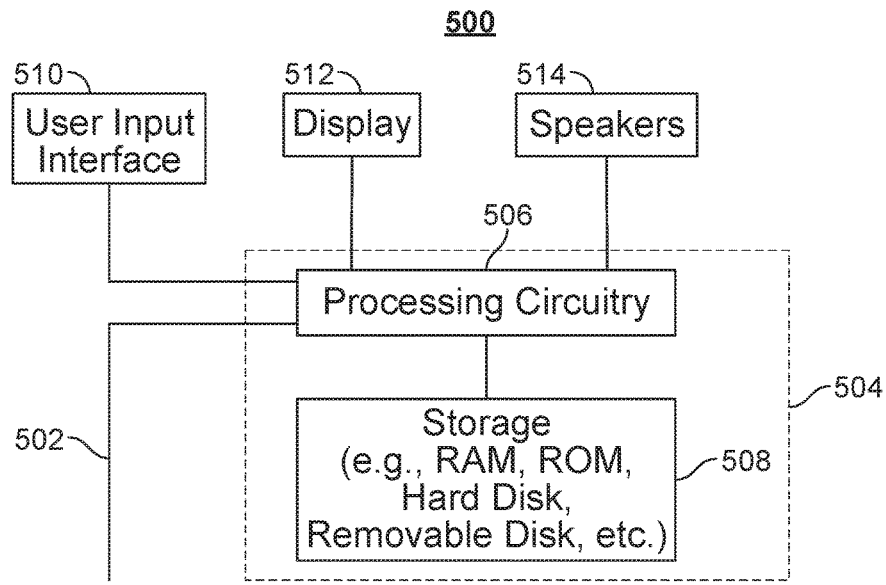
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
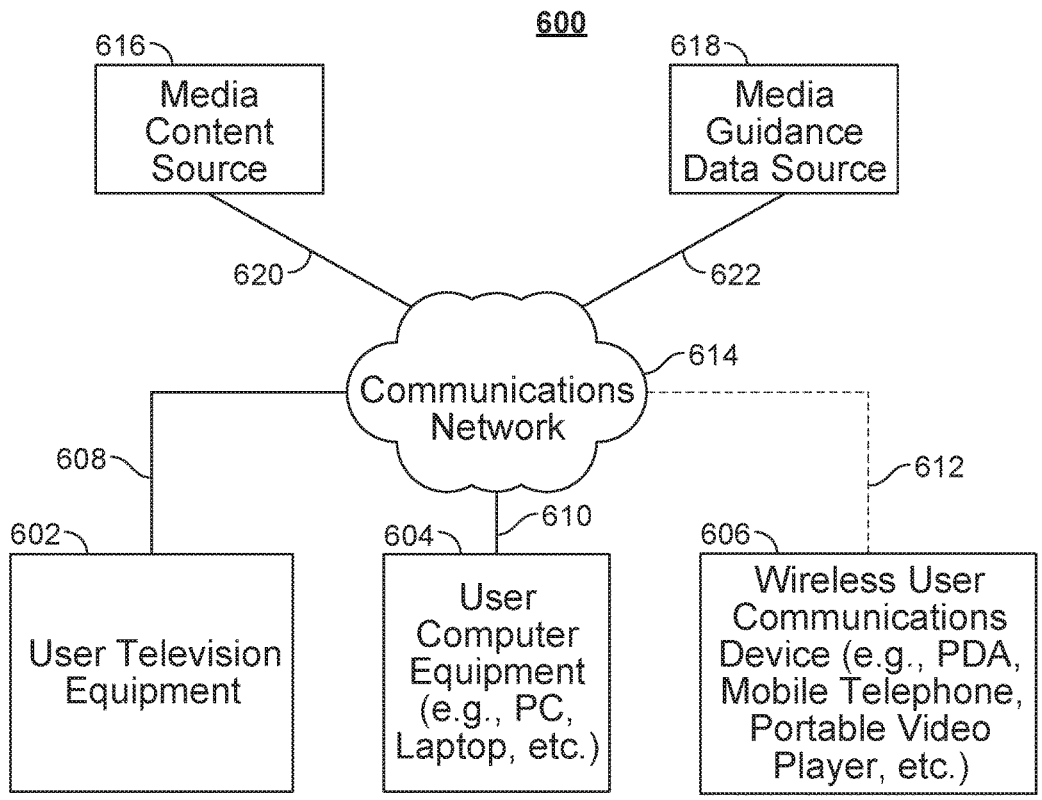
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
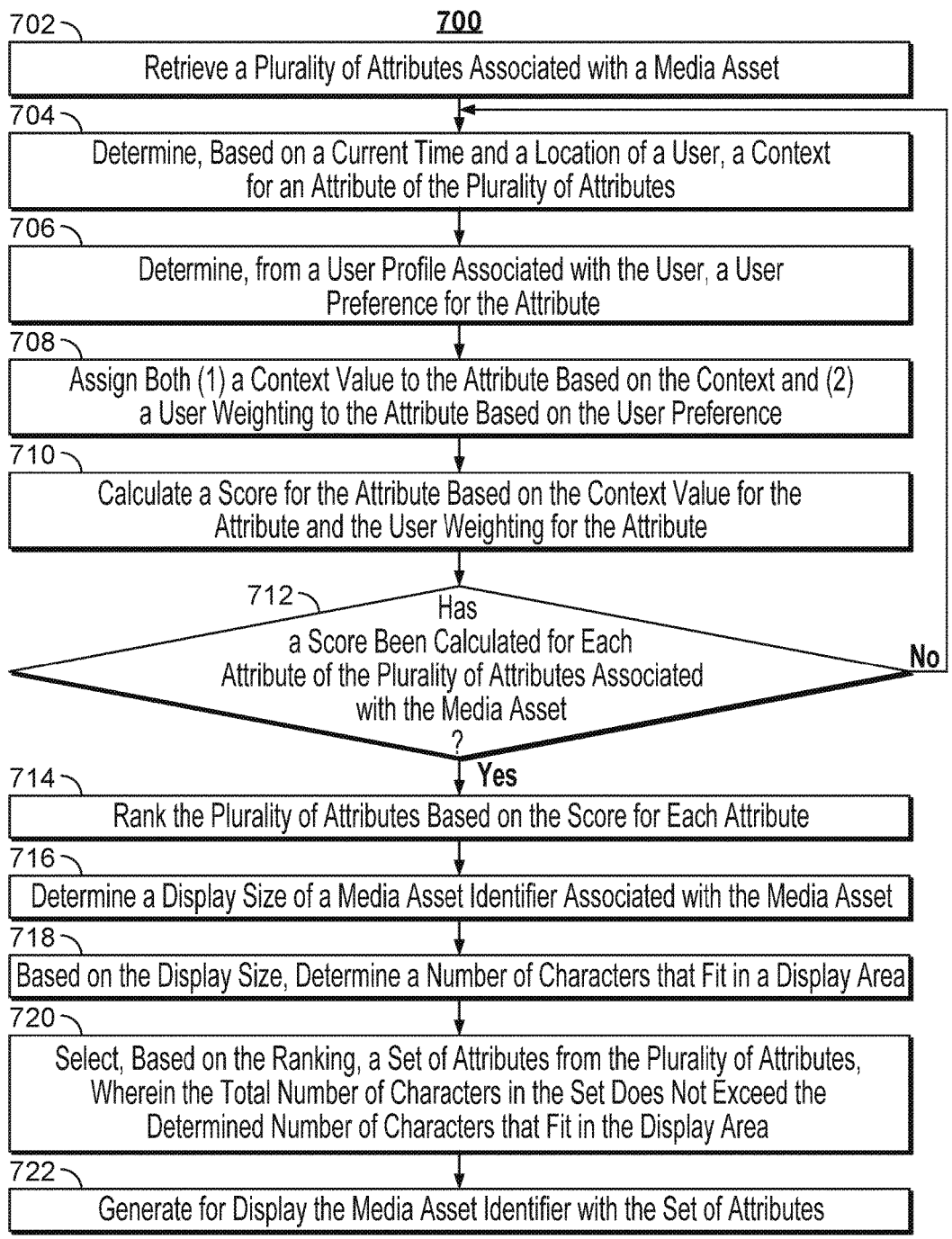
FIG. 7 is a flowchart of illustrative steps for presenting targeted metadata with media asset identifiers, in accordance with some embodiments of the disclosure.

FIG. 7 is a flowchart of illustrative steps for presenting targeted metadata with media asset identifiers, in accordance with some embodiments of the disclosure. For example, a media guidance application implementing process 700 may be executed by control circuitry 504 (FIG. 5). It should be noted that process 700 or any step thereof could be performed on, or provided by, any of the devices shown in FIGS. 5-6.

Process 700 begins with 702, where the media guidance application retrieves (e.g., via control circuitry 504 (FIG. 5)) a plurality of attributes associated with a media asset. For example, the media guidance application may retrieve (e.g., via control circuitry 504 (FIG. 5)) the plurality of attributes from local storage (e.g., storage 508 (FIG. 5)) or a remote server (e.g., from media guidance data source 618 via communications network 614 (FIG. 6)). For example, the media guidance application may transmit (e.g., via control circuitry 504 (FIG. 5)) a query including an identifier of the media asset to a database including a plurality of attributes associated with media assets. Based on the transmitted query, the media guidance application may receive (e.g., via control circuitry 504 (FIG. 5)) the plurality of attributes associated with the media asset (e.g., in a list or other data structure). As a specific example, the database may contain a plurality of tables, where each table is associated with a media asset, and each row of each table contains an attribute associated with the media asset. The row may also include a type of each attribute in another associated field (e.g., "actor"). The identifier of the media asset may be any combination of characters that are unique to the media asset. For example, the identifier may be the title of the media asset, or a number assigned by a content provider (e.g., content source 610 (FIG. 6)).

Process 700 continues to 704, where the media guidance application determines (e.g., via control circuitry 504 (FIG. 5)), based on a current time and a location of a user, a context for an attribute of the plurality of attributes. For example, the context may be any one or combination of the current season (e.g., Christmas time), the current time (e.g., afternoon), the user's location (e.g., Ohio). For example, the media guidance application may determine (e.g., via control circuitry 504 (FIG. 5)) the current time based on a current clock time. The media guidance application may determine (e.g., via control circuitry 504 (FIG. 5)) the location based on GPS coordinates of a device of the user (e.g., any of the devices discussed with respect to FIGS. 5-6) and/or based on an entry (e.g., via user input interface 510 (FIG. 5)) of the location by the user. The media guidance application may then compare (e.g., via control circuitry 504 (FIG. 5)) the determined location and current time to a data structure (e.g., stored locally in storage 508 or remotely at media guidance data source 618 accessible via communications network 614) that maps attributes and/or attribute types to current times and/or locations. For example, the data structure may be a table where each row contains a range of times and/or locations that correspond to a given context. For example, the context "Christmas" may correspond to December $1^{st}$ to $30^{th}$ in North America and Europe. The data structure may, for each context, include an indication of which types of attributes (e.g., genre, actor, etc.) or specific attributes (e.g., "Christmas movie") correspond to the context. Thus, if a particular attribute associated with a media asset is that the media asset is a "Christmas movie," the media guidance application may assign (e.g., via control circuitry 504 (FIG. 5)) the context "Christmas" if the time determined was December $10^{th}$ and the location was Ohio.

Process 700 continues to 706, where the media guidance application determines (e.g., via control circuitry 504 (FIG. 5)), from a user profile associated with the user, a user preference for the attribute. For example, the media guidance application may retrieve (e.g., via control circuitry 504 (FIG. 5)) a user profile associated with the user from local storage (e.g., storage 508 (FIG. 5)) or from a remote server (e.g., media guidance data source 618 via communications network 614 (FIG. 6)). The media guidance application may then retrieve (e.g., via control circuitry 504 (FIG. 5)) stored characteristics and preferences of the user from the user profile. For example, the media guidance application may retrieve (e.g., via control circuitry 504 (FIG. 5)) a viewing history of the user and determine common attributes (e.g., indicating that the user has a preference for the attribute). As a specific example, the media guidance application may determine (e.g., via control circuitry 504 (FIG. 5)) from a viewing history for the user that the user has watched seven movies with "Seth Rogen," and thus the user has a preference for Seth Rogen movies (e.g., movies where an associated attribute is "Seth Rogen"). The media guidance application may determine (e.g., via control circuitry 504 (FIG. 5)) a preference from an explicit indication from the user (e.g., a stored list of attributes the user likes). For example, the media guidance application may store (e.g., via control circuitry 504 (FIG. 5)) a list of attributes (e.g., actors) that the user has indicated that they like (e.g., manually input via user input interface 510).

Process 700 continues to 708, where the media guidance application assigns (e.g., via control circuitry 504 (FIG. 5)) both (1) a context value to the attribute based on the context and (2) a user weighting to the attribute based on the user preference. For example, the media guidance application may retrieve (e.g., via control circuitry 504 (FIG. 5)) a list or other data structure with a plurality of fields for the plurality of attributes each with associated fields for the context and the user preference. The media guidance application may process (e.g., via control circuitry 504 (FIG. 5)) the list or other data structure (e.g., by reading in strings of text or values corresponding to the context and the user preference for each attribute). The media guidance application may then assign (e.g., via control circuitry 504 (FIG. 5)) a context value based on an algorithm mapping the context value and the user weighting for each attribute to a numerical score. For example, if the date is December $10^{th}$, which corresponds to a context of Christmas time and an attribute of a media asset is that it is a "Christmas movie," the media guidance application may assign (e.g., via control circuitry 504 (FIG. 5)) a higher score to the "Christmas movie" attribute than it would at a different time of year (e.g., Summer). The media guidance application may similarly assign (e.g., via control circuitry 504 (FIG. 5)) a user weighting based on the user preference. For example, the media guidance application may assign (e.g., via control circuitry 504 (FIG. 5)) a greater user weighting to an attribute (e.g., "Seth Rogen") that matches a user preference than one that does not. For example, the exact value of the user weighting may depend on a relative amount that the user likes the attribute (e.g., a stored user preference for an attribute of 5/10 may correspond to a lower weighting than 8/10).

Process 700 continues to 710, where the media guidance application calculates (e.g., via control circuitry 504 (FIG. 5)) a score for the attribute based on the context value for the attribute and the user weighting for the attribute. For example, the media guidance application may combine (e.g., via control circuitry 504 (FIG. 5)) the user weighting and the context value to generate a single composite score for each attribute. As a specific example, if the scores are based on a ten point scale, and the context value is 4 and the user weighting is 4, the media guidance application may calculate (e.g., via control circuitry 504 (FIG. 5)) a value of 8.

Process 700 continues to 712, where the media guidance application determines (e.g., via control circuitry 504 (FIG. 5)) if a score has been calculated for each attribute of the plurality of attributes associated with the media asset. For example, the media guidance application may execute (e.g., via control circuitry 504 (FIG. 5)) a program script that iteratively determines a score (e.g., based on performing steps 704 through 710) for each attribute of the plurality of attributes. If, at 712, the media guidance application determines that a score has not been calculated for each attribute of the plurality of attributes, process 700 returns to 704, where the media guidance application determines (e.g., via control circuitry 504 (FIG. 5)), based on a current time and a location of a user, a context for an attribute of the plurality of attributes. For example, if the media guidance application determines (e.g., based on an iterator of a for-loop executed by the media guidance application being less than the total number of attributes in the plurality of attributes) that an attribute remains for which a score has not yet been calculated, the media guidance application may return to 704 and determine a context for that attribute. The media guidance application may, alternatively or additionally, generate (e.g., via control circuitry 504 (FIG. 5)) a data structure with identifiers of each attribute, where the data structure includes a field for the score for each attribute. If the media guidance application determines (e.g., via control circuitry 504 (FIG. 5)) that the field associated with one or more attributes is empty, the media guidance application may return to 704 and determine a context of the attribute, as described above.

If, at 712, the media guidance application determines that a score has been calculated for each attribute of the plurality of attributes, process 700 continues to 714, where the media guidance application ranks (e.g., via control circuitry 504 (FIG. 5)) the plurality of attributes based on the score for each attribute. For example, the media guidance application may store (e.g., in storage 508 (FIG. 5) or remotely at media guidance data source 618 accessible via communications network 614 (FIG. 6)) the calculated score for each attribute as well as an identifier of each attribute in a data structure. The data structure may be a list, array, or other data structure suitable for storing the calculated scores for each attribute. The media guidance application may then sort (e.g., via control circuitry 504 (FIG. 5)) and order the attributes based on their associated scores. For example, the media guidance application may execute (e.g., via control circuitry 504 (FIG. 5)) a program script utilizing a bubble sort, merge sort, or other suitable sorting algorithm to order the attributes from highest score to lowest score.

Process 700 continues to 716, where the media guidance application determines (e.g., via control circuitry 504 (FIG. 5)) a display size of a media asset identifier associated with the media asset. For example, the media guidance application may determine (e.g., via control circuitry 504 (FIG. 5)) that a media asset identifier that will be generated for display will be of given dimensions (e.g., pixel dimensions). The media guidance application may determine (e.g., via control circuitry 504 (FIG. 5)) the dimensions of the media asset identifier from a field associated with a display object for the media guidance application in a display template.

Process 700 continues to 718, where the media guidance application determines (e.g., via control circuitry 504 (FIG. 5)), based on the display size, a number of characters that fit in a display area. For example, the media guidance application may retrieve (e.g., via control circuitry 504 (FIG. 5)) from a field of a display template corresponding to a display to be displayed (e.g., a grid-guide) that a particular object (e.g., a cell) corresponding to the media asset identifier can fit a particular number of characters (e.g., 100 characters). Alternatively or additionally, the media guidance application may determine (e.g., via control circuitry 504 (FIG. 5)) the number of characters based on a font type (e.g., Times New Roman) to be displayed with the media asset identifier. For example, the media guidance application may access (e.g., via control circuitry 504 (FIG. 5)) a database (e.g., in storage 508 (FIG. 5) or remotely at media guidance data source 618 accessible via communications network 614 (FIG. 6)) that stores adjustments to a stored number of default characters stored in the field of the display template (e.g., 100 characters). For example, the media guidance application may determine (e.g., via control circuitry 504 (FIG. 5)) that a particular font type is 10% smaller, so 10% more characters can fit in the display area.

Process 700 continues to 720, where the media guidance application selects (e.g., via control circuitry 504 (FIG. 5)), based on the ranking, a set of attributes from the plurality of attributes, wherein the total number of characters in the set does not exceed the determined number of characters that fit in the display area. For example, the media guidance application may initialize (e.g., via control circuitry 504 (FIG. 5)) a counter for the number of characters of attributes that are currently selected and increment the counter based on the number of characters in each attribute that is selected. As a specific example, the media guidance application may select (e.g., via control circuitry 504 (FIG. 5)) the highest ranked attribute, which may have 30 characters, and set the counter to 30. The media guidance application may then select (e.g., via control circuitry 504 (FIG. 5)) the next highest rated attribute and update the counter by adding the number of characters of the next highest rated attribute and so on until the counter exceeds the determined number of characters that fit in the display area. For example, once the media guidance application determines (e.g., via control circuitry 504 (FIG. 5)) that an nth retrieved attribute exceeds the determined number of characters that fit in the display area, the media guidance application may determine (e.g., via control circuitry 504 (FIG. 5)) that the nth-1 retrieved attribute is the last attribute that fits in the display area.

Process 700 continues to 722, where the media guidance application generates (e.g., via control circuitry 504 (FIG. 5)) for display the media asset identifier with the set of attributes. For example, the media guidance application may generate (e.g., via control circuitry 504 (FIG. 5)) identifiers of the attributes (e.g., strings of characters) for display (e.g., on display 512 (FIG. 5)) in a particular section of the display corresponding to the media asset identifier. As a specific example, the media guidance application may generate (e.g., via control circuitry 504 (FIG. 5)) for display (e.g., on display 512 (FIG. 5)) a cell in a grid guide corresponding to the media asset identifier, where the attributes (e.g., title, genre, etc.) that were selected based on their ranking are displayed.

Figure 8:
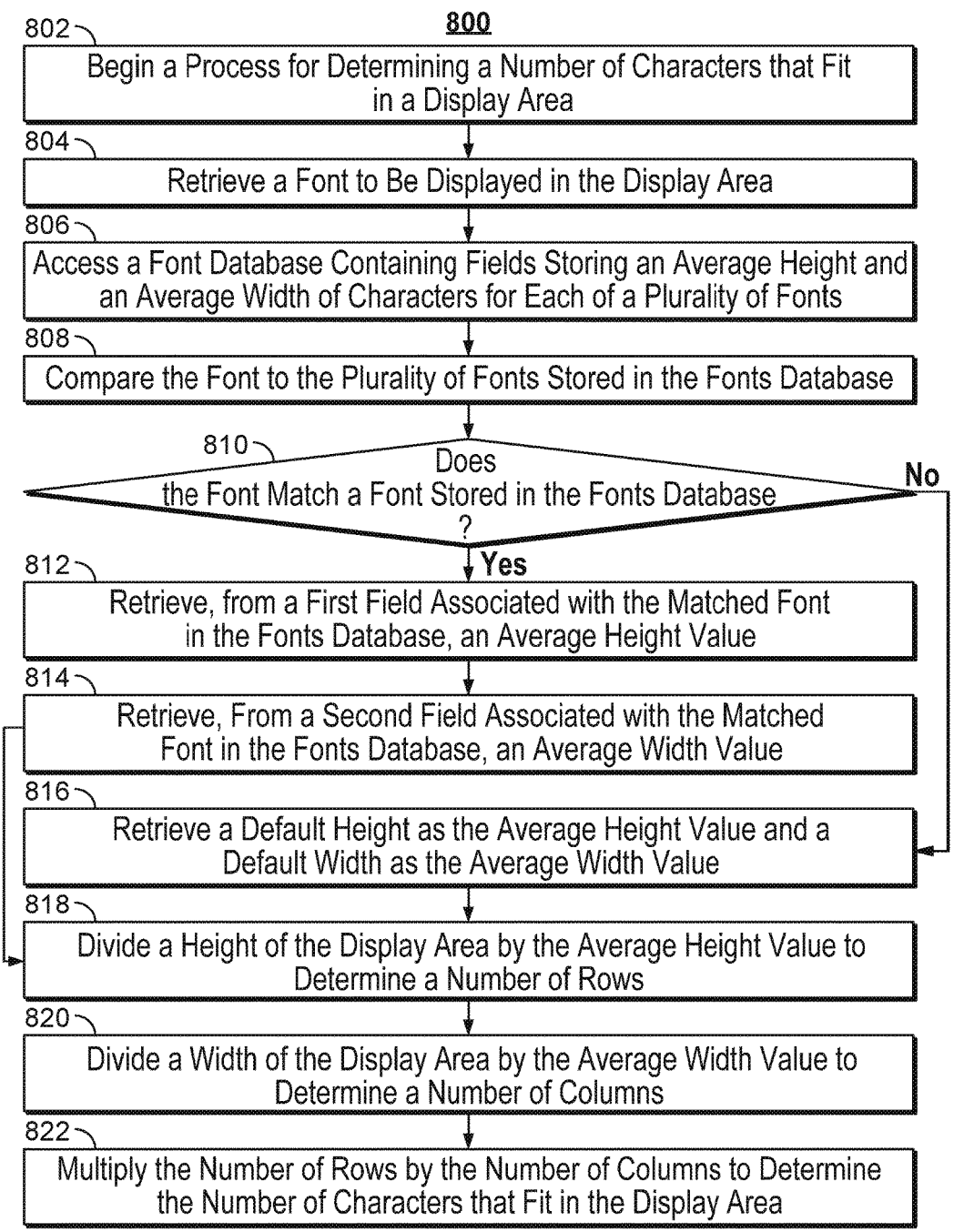
FIG. 8 is a flowchart of illustrative steps for determining a number of characters that fit in a display area, in accordance with some embodiments of the disclosure.

FIG. 8 is a flowchart of illustrative steps for determining a number of characters that fit in a display area, in accordance with some embodiments of the disclosure. For example, a media guidance application implementing process 800 may be executed by control circuitry 504 (FIG. 5). It should be noted that process 800 or any step thereof could be performed on, or provided by, any of the devices shown in FIGS. 5-6. Process 800 starts at 802, where the media guidance application begins (e.g., via control circuitry 504 (FIG. 5)) a process for determining a number of characters that fit in a display area. For example, the media guidance application may initialize the necessary variables and execute (e.g., via control circuitry 504 (FIG. 5)) a program script calling a particular method to execute process 800.

Process 800 continues to 804, where the media guidance application retrieves (e.g., via control circuitry 504 (FIG. 5)) a font to be displayed in the display area. For example, the media guidance application may retrieve (e.g., via control circuitry 504 (FIG. 5)), from a stored field in a display template (e.g., as described above with respect to FIG. 1) an identifier of a font type for a display area (e.g., a cell in a grid-guide). The identifier may be a string of characters (e.g., "Times") and/or any other identifier (e.g., a combination of alphanumeric characters) that can be matched to characteristics of the appropriate font type, which may also be stored in the display template or in a separate data structure.

Process 800 continues to 806, where the media guidance application accesses (e.g., via control circuitry 504 (FIG. 5)) a font database containing fields storing an average height and an average width of characters for each of a plurality of fonts. For example, the media guidance application may access the font database (e.g., locally in storage 508 (FIG. 5) or remotely at media guidance data source 618 accessible via communications network 614 (FIG. 6)). The font database may be organized as a table and contain a plurality of rows, where each row contains an identifier of a font as well as attribute (e.g., average sizes) of the font in associated fields.

Process 800 continues to 808, where the media guidance application compares (e.g., via control circuitry 504 (FIG. 5)) the font to the plurality of fonts stored in the fonts database. For example, the media guidance application may compare (e.g., via control circuitry 504 (FIG. 5)) the characters retrieved from the display template identifying the font with each of a plurality of identifiers of fonts stored in the font database.

Process 800 continues to 810, where the media guidance application determines (e.g., via control circuitry 504 (FIG. 5)) whether the font matches a font stored in the fonts database. For example, the media guidance application may determine (e.g., via control circuitry 504 (FIG. 5)) a match if each character of the font to be displayed matches (e.g., in order) characters of the identifier. In some embodiments, the media guidance application may determine (e.g., via control circuitry 504 (FIG. 5)) a match if a threshold percentage of characters match (e.g., 90%).

If, at 810, the media guidance application determines that the font does match a font stored in the fonts database, process 800 continues to 812, where the media guidance application retrieves (e.g., via control circuitry 504 (FIG. 5)), from a first field associated with the matched font in the fonts database, an average height value. For example, the media guidance application may retrieve (e.g., via control circuitry 504 (FIG. 5)), from a field associated with the matched font stored in the font database, a value (e.g., 40 pixels) for the average height of the font. In some embodiments, the field may contain a mathematical function of font size (e.g., 12-point), which the media guidance application may retrieve (e.g., via control circuitry 504 (FIG. 5)). The media guidance application may determine (e.g., via control circuitry 504 (FIG. 5)) the average height value based on inputting a font size (e.g., stored in the display template) into the mathematical function and receiving the average height value as an output.

Process 800 continues to 814, where the media guidance application retrieves (e.g., via control circuitry 504 (FIG. 5)), from a second field associated with the matched font in the fonts database, an average width value. For example, the media guidance application may retrieve (e.g., via control circuitry 504 (FIG. 5)), from another field associated with the matched font stored in the font database, a value (e.g., 20 pixels) for the average width of the font. In some embodiments, the field may contain a mathematical function of font size (e.g., 12-point), which the media guidance application may retrieve (e.g., via control circuitry 504 (FIG. 5)). The media guidance application may determine (e.g., via control circuitry 504 (FIG. 5)) the average width value based on inputting a font size (e.g., stored in the display template) into the mathematical function and receiving the average width (e.g., 20 pixels) as an output.

If, at 810, the media guidance application determines that the font does not match a font stored in the fonts database, process 800 continues to 816, where the media guidance application retrieves (e.g., via control circuitry 504 (FIG. 5)) a default height as the average height value and a default width as the average width value. For example, if no entry for the font to be display matches a font in the font database, the media guidance application may retrieve (e.g., via control circuitry 504 (FIG. 5)) default values stored in the fonts database for the average height and width of all fonts in the database and use these values to approximate the number of characters that will fit in a display area, as described further below.

Process 800 continues to 818, where the media guidance application divides (e.g., via control circuitry 504 (FIG. 5)) a height of the display area by the average height value to determine a number of rows. For example, the media guidance application may retrieve (e.g., via control circuitry 504 (FIG. 5)), from the display template, a value for the height of the display area (e.g., 80 pixels). For example, the media guidance application may calculate (e.g., via control circuitry 504 (FIG. 5)) the number of rows of text in the given font that can be displayed (e.g., 2) by dividing the height of the display area (e.g., 80 pixels) by the average height of a character of the font (e.g., 40 pixels).

Process 800 continues to 820, where the media guidance application divides (e.g., via control circuitry 504 (FIG. 5)) a width of the display area by the average width value to determine a number of columns. For example, the media guidance application may retrieve (e.g., via control circuitry 504 (FIG. 5)), from the display template, a value for the width of the display area (e.g., 400 pixels). For example, the media guidance application may calculate (e.g., via control circuitry 504 (FIG. 5)) the number of columns of text in the given font that can be displayed (e.g., 20) by dividing the width of the display area (e.g., 400 pixels) by the average width of a character of the font (e.g., 20 pixels).

Process 800 continues to 822, where the media guidance application multiplies (e.g., via control circuitry 504 (FIG. 5)) the number of rows by the number of columns to determine the number of characters that fit in the display area. For example, the media guidance application may calculate (e.g., via control circuitry 504 (FIG. 5)) that the number of characters that can fit in the display area is 40, based on multiplying the number of rows (e.g., 2) by the number of columns (e.g., 20).

Figure 9:
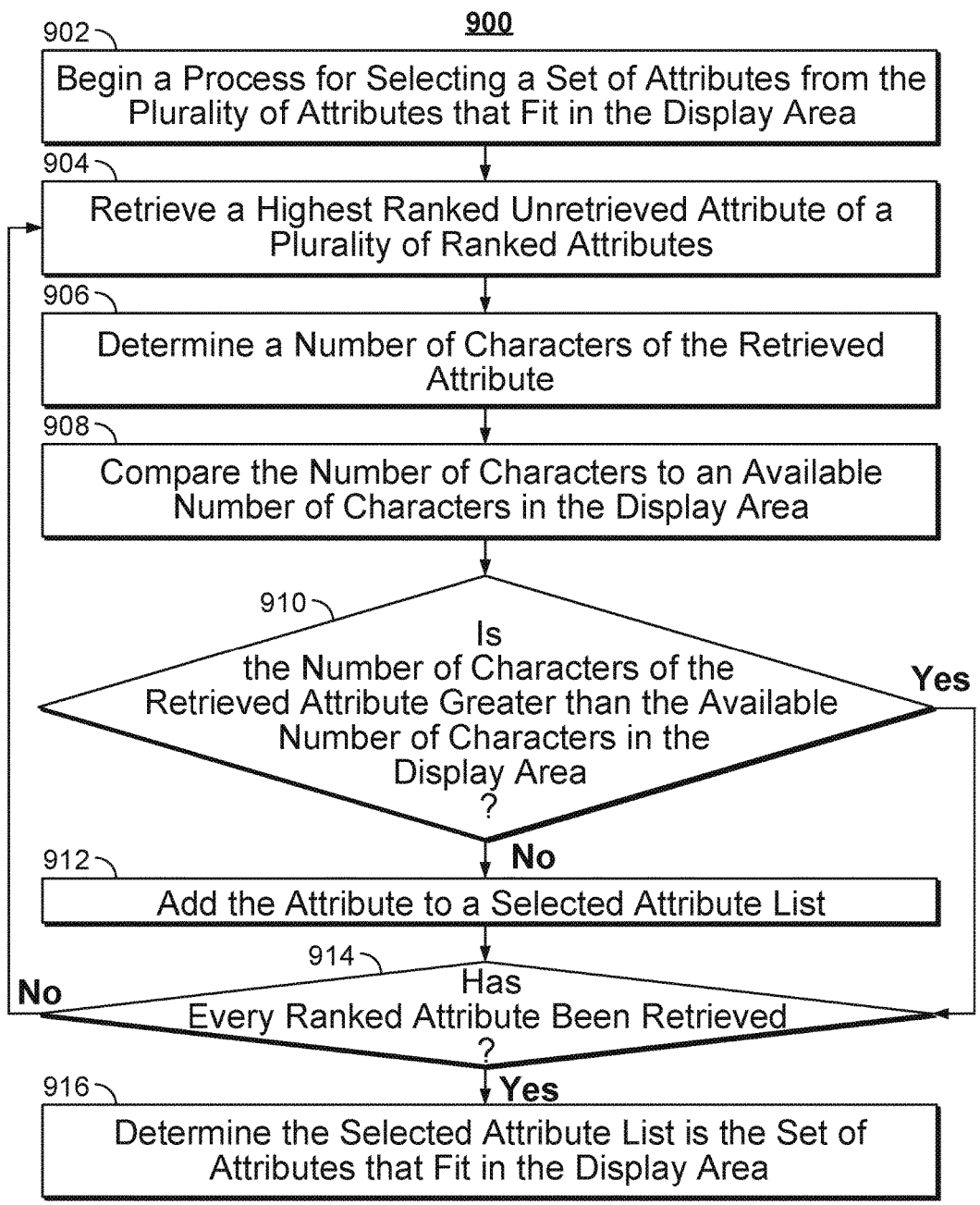
FIG. 9 is a flowchart of illustrative steps for selecting a set of attributes from the plurality of attributes that fit in the display area.

FIG. 9 is a flowchart of illustrative steps for selecting a set of attributes from the plurality of attributes that fit in the display area, in accordance with some embodiments of the disclosure. For example, a media guidance application implementing process 900 may be executed by control circuitry 504 (FIG. 5). It should be noted that process 900 or any step thereof could be performed on, or provided by, any of the devices shown in FIGS. 5-6. Process 900 starts at 902, where the media guidance application begins (e.g., via control circuitry 504 (FIG. 5)) a process for selecting a set of attributes from the plurality of attributes that fit in the display area. For example, the media guidance application may initialize the necessary variables and execute (e.g., via control circuitry 504 (FIG. 5)) a program script calling a particular method to execute process 900.

Process 900 continues to 904, where the media guidance application retrieves (e.g., via control circuitry 504 (FIG. 5)) a highest ranked unretrieved attribute of a plurality of ranked attributes. For example, the media guidance application may retrieve (e.g., via control circuitry 504 (FIG. 5)) from a stored data structure (e.g., in storage 508 (FIG. 5) or remote at media guidance data source 618 accessible via communications network 614 (FIG. 6)) an identifier (e.g., a string of characters defining the attribute, such as "Brad Pitt"). The media guidance application may execute (e.g., via control circuitry 504 (FIG. 5)) a program script utilizing a for-loop to iteratively retrieve successive ranked attributes in the data structure (e.g., the highest ranked is retrieved first, then the second highest, and so on).

Process 900 continues to 906, where the media guidance application determines (e.g., via control circuitry 504 (FIG. 5)) a number of characters of the retrieved attribute. For example, the media guidance application may execute (e.g., via control circuitry 504 (FIG. 5)) a program script utilizing a library function (e.g., strlen(string) in C++) to return the number of characters in the string of text (e.g., "Brad Pitt") for the retrieved attribute.

Process 900 continues to 908, where the media guidance application compares (e.g., via control circuitry 504 (FIG. 5)) the number of characters to an available number of characters in the display area. For example, the media guidance application may compare (e.g., via control circuitry 504 (FIG. 5)) the number of characters of the retrieved attribute (e.g., 40 characters) and the number of characters available in the display area (e.g., 50 characters) to determine whether the number of characters of the retrieved attribute is less than, greater than, or equal to the number of characters available in the display area.

Process 900 continues to 910, where the media guidance application determines (e.g., via control circuitry 504 (FIG. 5)) whether the number of characters of the retrieved attribute is greater than the available number of characters in the display area. For example, the media guidance application may determine (e.g., via control circuitry 504 (FIG. 5)) whether the number of characters of the retrieved attribute (e.g., 40 characters) are greater than the number of characters available in the display area (e.g., 50 characters) by comparing the two values (e.g., by comparing variables storing the values for the number of characters to determine which is greater).

If, at 910, the media guidance application determines that the number of characters of the retrieved attribute is not greater than the available number of characters in the display area, process 900 continues to 912, where the media guidance application adds (e.g., via control circuitry 504 (FIG. 5)) the attribute to a selected attribute list. For example, the media guidance application may determine (e.g., via control circuitry 504 (FIG. 5)) that there is space (e.g., there are enough characters available in the display area) to display the attribute if the number of characters is not greater than the number available in the display area. As a specific example, the media guidance application may determine (e.g., via control circuitry 504 (FIG. 5)) that the attribute can be displayed if the attribute is 40 characters and the number of characters available in the display area is 50. For example, the media guidance application may then add (e.g., write an identifier of the attribute) to a data structure (e.g., a list) storing attributes that will be displayed with the media asset identifier. The media guidance application may then update (e.g., via control circuitry 504 (FIG. 5)) the number of characters available in the display area by subtracting the number of characters of the attribute (e.g., subtracting 40 from 50, thus 10 characters are still available). Process 900 then continues to 914.

If, at 910, the media guidance application determines that the number of characters of the retrieved attribute is greater than the available number of characters in the display area, process 900 continues to 914, where the media guidance application determines (e.g., via control circuitry 504 (FIG. 5)) whether every attribute has been retrieved. For example, the media guidance application may determine (e.g., via control circuitry 504 (FIG. 5)) whether every attribute has been retrieved when a for-loop iterating through every attribute (e.g., stored in a data structure) terminates. The media guidance application may alternatively or additionally determine (e.g., via control circuitry 504 (FIG. 5)) whether every attribute has been retrieved based on storing an identifier of each attribute that has been retrieved in a list or other data structure and comparing the list or other data structure to the data structure with every attribute associated with the media asset.

If, at 914, the media guidance application determines that not every attribute has been retrieved, process 900 returns to 904, where the media guidance application retrieves (e.g., via control circuitry 504 (FIG. 5)) a highest ranked unretrieved attribute of a plurality of ranked attributes. For example, the media guidance application may determine (e.g., via control circuitry 504 (FIG. 5)) that an attribute has not yet been retrieved, as described above with respect to 914. The media guidance application may then retrieve the attribute (e.g., the next highest ranked since the plurality of ranked attributes is ordered) until every attribute is retrieved and the number of characters of the attribute is determined. In this way, the media guidance application may ensure that the display area is filled by checking (e.g., via control circuitry 504 (FIG. 5)) every associated attribute with the media asset to see if it fits in the display area (e.g., based on the number of characters).

If, at 914, the media guidance application determines that every attribute has been retrieved, process 900 returns to 916, where the media guidance application determines (e.g., via control circuitry 504 (FIG. 5)) the selected attribute list is the set of attributes that fit in the display area. For example, upon determining that there are no more attributes to check, the media guidance application may generate (e.g., via control circuitry 504 (FIG. 5)) for display the media asset identifier with the selected attributes (e.g., the attributes added to a list of selected attributes as described above). In some embodiments, the media guidance application may cease (e.g., via control circuitry 504 (FIG. 5)) checking attributes to determine whether they fit in the display area if the number of characters available in the display area is zero.

Figure 10:
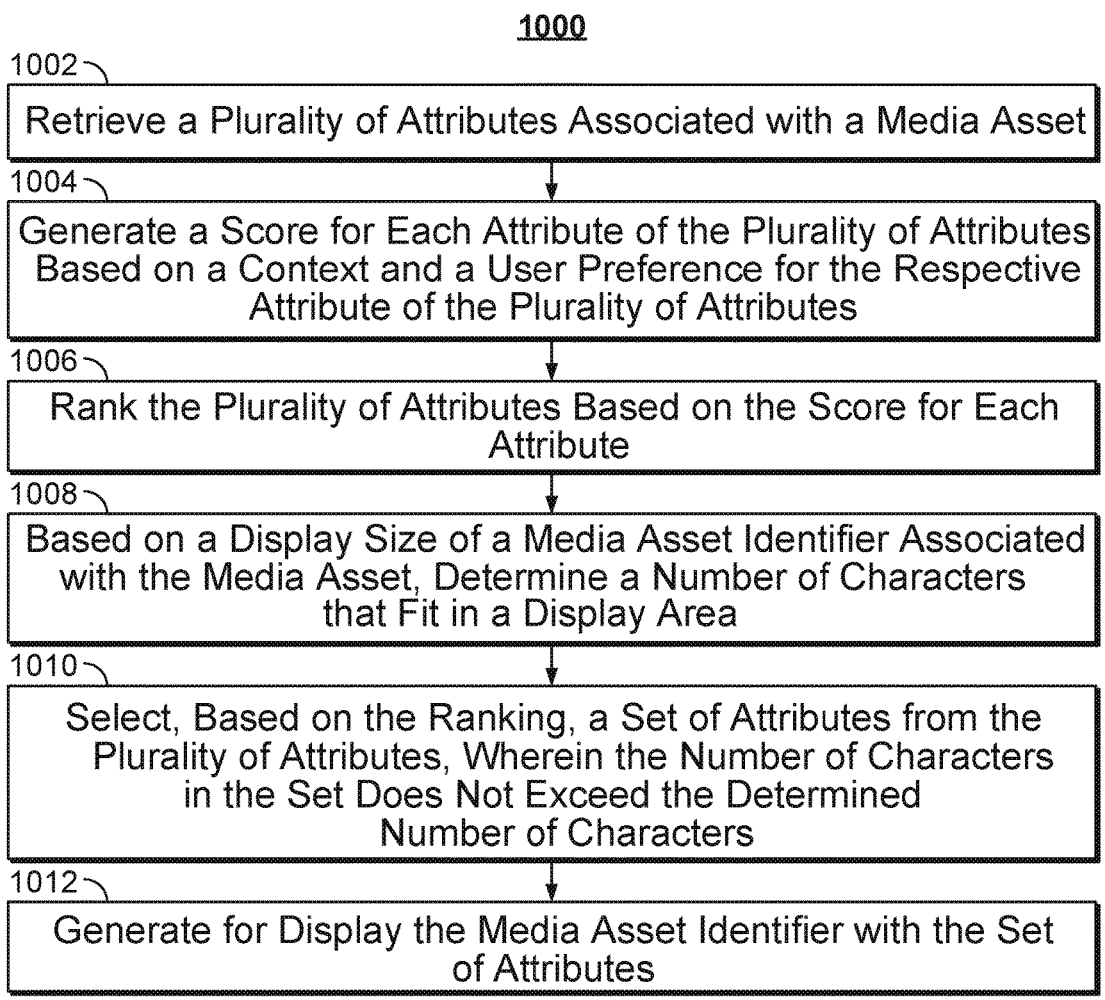
FIG. 10 is another flowchart of illustrative steps for presenting targeted metadata with media asset identifiers, in accordance with some embodiments of the disclosure.

FIG. 10 is another flowchart of illustrative steps for presenting targeted metadata with media asset identifiers, in accordance with some embodiments of the disclosure. For example, a media guidance application implementing process 1000 may be executed by control circuitry 504 (FIG. 5). It should be noted that process 1000 or any step thereof could be performed on, or provided by, any of the devices shown in FIGS. 5-6.

Process 1000 begins with 1002, where the media guidance application retrieves (e.g., via control circuitry 504 (FIG. 5)) a plurality of attributes associated with a media asset. For example, the media guidance application may retrieve (e.g., via control circuitry 504 (FIG. 5)) the plurality of attributes from local storage (e.g., storage 508 (FIG. 5)) or a remote server (e.g., from media guidance data source 618 via communications network 614 (FIG. 6)). For example, the media guidance application may transmit (e.g., via control circuitry 504 (FIG. 5)) a query including an identifier of the media asset to a database including a plurality of attributes associated with media assets. Based on the transmitted query, the media guidance application may receive (e.g., via control circuitry 504 (FIG. 5)) the plurality of attributes associated with the media asset (e.g., in a list or other data structure). As a specific example, the database may contain a plurality of tables, where each table is associated with a media asset, and each row of each table contains an attribute associated with the media asset. The row may also include a type of each attribute in another associated field (e.g., "actor"). The identifier of the media asset may be any combination of characters that are unique to the media asset. For example, the identifier may be the title of the media asset, or a number assigned by a content provider (e.g., content source 610 (FIG. 6)).

Process 1000 continues to 1004, where the media guidance application generates (e.g., via control circuitry 504 (FIG. 5)) a score for each attribute of the plurality of attributes based on a context and a user preference for the respective attribute of the plurality of attributes. For example, the media guidance application may retrieve (e.g., via control circuitry 504 (FIG. 5)) a list or other data structure with a plurality of fields for the plurality of attributes each with associated fields for the context and the user preference. The media guidance application may process (e.g., via control circuitry 504 (FIG. 5)) the list or other data structure (e.g., by reading in strings of text or values corresponding to the context and the user preference for each attribute). The media guidance application may then assign (e.g., via control circuitry 504 (FIG. 5)) a context value based on an algorithm mapping the context value and the user weighting for each attribute to a numerical score. For example, if the date is December $10^{th}$, which corresponds to a context of Christmas time and an attribute of a media asset is that it is a "Christmas movie," the media guidance application may assign (e.g., via control circuitry 504 (FIG. 5)) a higher score to the "Christmas movie" attribute than it would at a different time of year (e.g., Summer). The media guidance application may similarly assign (e.g., via control circuitry 504 (FIG. 5)) a user weighting based on the user preference. For example, the media guidance application may assign (e.g., via control circuitry 504 (FIG. 5)) a greater user weighting to an attribute (e.g., "Seth Rogen") that matches a user preference than one that does not. For example, the exact value of the user weighting may depend on a relative amount that the user likes the attribute (e.g., a stored user preference for an attribute of 5/10 may correspond to a lower weighting than 8/10). For example, the media guidance application may combine (e.g., via control circuitry 504 (FIG. 5)) the user weighting and the context value to generate a single composite score for each attribute. As a specific example, if the scores are based on a ten point scale, and the context value is 4 and the user weighting is 4, the media guidance application may calculate (e.g., via control circuitry 504 (FIG. 5)) a value of 8.

Process 1000 continues to 1006, where the media guidance application ranks (e.g., via control circuitry 504 (FIG. 5)) the plurality of attributes based on the score for each attribute. For example, the media guidance application may store (e.g., in storage 508 (FIG. 5) or remotely at media guidance data source 618 accessible via communications network 614 (FIG. 6)) the calculated score for each attribute as well as an identifier of each attribute in a data structure. The data structure may be a list, array, or other data structure suitable for storing the calculated scores for each attribute. The media guidance application may then sort (e.g., via control circuitry 504 (FIG. 5)) and order the attributes based on their associated scores. For example, the media guidance application may execute (e.g., via control circuitry 504 (FIG. 5)) a program script utilizing a bubble sort, merge sort, or other suitable sorting algorithm to order the attributes from highest score to lowest score.

Process 1000 continues to 1008, where the media guidance application determines (e.g., via control circuitry 504 (FIG. 5), based on a display size of a media asset identifier associated with the media asset, a number of characters that fit in a display area. For example, the media guidance application may retrieve (e.g., via control circuitry 504 (FIG. 5)) from a field of a display template corresponding to a display to be displayed (e.g., a grid-guide) that a particular object (e.g., a cell) corresponding to the media asset identifier can fit a particular number of characters (e.g., 100 characters). Alternatively or additionally, the media guidance application may determine (e.g., via control circuitry 504 (FIG. 5)) the number of characters based on a font type (e.g., Times New Roman) to be displayed with the media asset identifier. For example, the media guidance application may access (e.g., via control circuitry 504 (FIG. 5)) a database (e.g., in storage 508 (FIG. 5) or remotely at media guidance data source 618 accessible via communications network 614 (FIG. 6)) that stores adjustments to a stored number of default characters stored in the field of the display template (e.g., 100 characters). For example, the media guidance application may determine (e.g., via control circuitry 504 (FIG. 5)) that a particular font type is 10% smaller, so 10% more characters can fit in the display area.

Process 1000 continues to 1010, where the media guidance application selects (e.g., via control circuitry 504 (FIG. 5)), based on the ranking, a set of attributes from the plurality of attributes, wherein the number of characters in the set does not exceed the determined number of characters. For example, the media guidance application may initialize (e.g., via control circuitry 504 (FIG. 5)) a counter for the number of characters of attributes that are currently selected and increment the counter based on the number of characters in each attribute that is selected. As a specific example, the media guidance application may select (e.g., via control circuitry 504 (FIG. 5)) the highest ranked attribute, which may have 30 characters, and set the counter to 30. The media guidance application may then select (e.g., via control circuitry 504 (FIG. 5)) the next highest rated attribute and update the counter by adding the number of characters of the next highest rated attribute and so on until the counter exceeds the determined number of characters that fit in the display area. For example, once the media guidance application determines (e.g., via control circuitry 504 (FIG. 5)) that an nth retrieved attribute exceeds the determined number of characters that fit in the display area, the media guidance application may determine (e.g., via control circuitry 504 (FIG. 5)) that the nth-1 retrieved attribute is the last attribute that fits in the display area.

Process 1000 continues to 1012, where the media guidance application generates (e.g., via control circuitry 504 (FIG. 5)) for display the media asset identifier with the set of attributes. For example, the media guidance application may generate (e.g., via control circuitry 504 (FIG. 5)) identifiers of the attributes (e.g., strings of characters) for display (e.g., on display 512 (FIG. 5)) in a particular section of the display corresponding to the media asset identifier. As a specific example, the media guidance application may generate (e.g., via control circuitry 504 (FIG. 5)) for display (e.g., on display 512 (FIG. 5)) a cell in a grid guide corresponding to the media asset identifier, where the attributes (e.g., title, genre, etc.) that were selected based on their ranking are displayed.

It is contemplated that the steps or descriptions of each of FIGS. 7-10 may be used with any other embodiment of this disclosure. In addition, the steps and descriptions described in relation to FIGS. 7-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIGS. 7-10.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting targeted metadata with media asset identifiers, the method comprising:

retrieving a plurality of attributes associated with a media asset;
generating a score for each attribute of the plurality of attributes by:
    determining, based on a current time and a location of a user, a context for each attribute by:
        transmitting, to a social media website, the current time and the location;
        receiving, from the social media website, a data structure including a plurality of topics at the current time and the location;
        comparing each attribute to each topic of the plurality of topics received from the social media website;
        identifying, based on the comparing, that a first subset of the plurality of attributes associated with the media asset each correspond to a respective topic of the plurality of topics; and
        determining the context for each attribute in the first subset based on the corresponding topic of the plurality of topics;
    determining, from a user profile associated with the user, a user preference for each attribute;
    assigning both (1) a context value to each attribute based on the context and (2) a user weighting to each attribute based on the user preference; and
    calculating the score based on the context value for each attribute and the user weighting for each attribute;
ranking the plurality of attributes based on the score for each attribute;
determining a display size of a media asset identifier associated with the media asset;
based on the display size, determining a number of characters that fit in a display area;
selecting, based on the ranking, a set of attributes from the plurality of attributes, wherein the total number of characters in the set does not exceed the determined number of characters that fit in the display area; and
generating for display the media asset identifier with the set of attributes.

2. The method of claim 1, wherein determining, based on the current time and the location of the user, the context for each attribute comprises:
    comparing the current time and the location of the user to a plurality of current times and locations stored in a database;
    determining that the current time and location of the user matches a stored time and a stored location in the database;
    retrieving, from a field associated with the matched stored time and the matched stored location, a context mapping for attributes;
    processing each attribute of the plurality of attributes associated with the media asset with the context mapping for attributes; and
    determining the context for each attribute of the plurality of attributes based on output of the context mapping.

3. The method of claim 1, wherein determining, from the user profile associated with the user, the user preference for each attribute comprises:
    retrieving the user profile;
    retrieving user preferences for the user from the user profile;
    comparing each attribute to each user preference of the user preferences;
    identifying, based on comparing each attribute to each user preference of the user preferences, that a second subset of the plurality of attributes associated with the media asset each correspond to a respective user preference of the user preferences; and
    determining the user preference for each attribute in the second subset based on the corresponding user preference of the user preferences.

4. The method of claim 1, wherein calculating the score based on the context value for each attribute and the user weighting for each attribute comprises:
    retrieving a data structure with default scores for the plurality of attributes associated with the media asset;
    retrieving, from a field corresponding to each attribute of the plurality of attributes, a default score for each attribute; and
    adjusting the default score for each attribute based on the context value and the user weighting.

5. The method of claim 1, wherein determining the display size of the media asset identifier associated with the media asset comprises:
    receiving a user input corresponding to a request to generate a display with the media asset identifier;
    retrieving a display template that corresponds to the user request, wherein the display template includes a plurality of display sizes associated with objects to be displayed;
    determining that the media asset identifier associated with the media asset corresponds to a first object to be displayed; and
    retrieving, from the display template, the display size associated with the first object to be displayed.

6. The method of claim 1, wherein determining the number of characters that fit in the display area comprises:
    determining a font type to be displayed in the display area;
    retrieving an average character size for the font type;
    comparing the average character size to the display size of the media asset identifier; and
    based on comparing the average character size to the display size, determining the number of characters that fit in the display area.

7. The method of claim 1, wherein selecting, based on the ranking, the set of attributes from the plurality of attributes comprises:
    retrieving, from the user profile, a user display rating for each attribute type of a plurality of attribute types; and
    maximizing a total user display rating of attributes that are displayed by:
        determining an attribute type for each attribute of the plurality of attributes associated with the media asset;
        determining a user display rating for each attribute of the plurality of attributes based on the respective attribute type;
        identifying attributes of the plurality of attributes that maximize the total user display rating by processing the ranked plurality of attributes with a model including both (1) the user display rating and (2) a number of characters of each attribute of the plurality of attributes; and
        selecting the identified attributes as the set of attributes.

8. The method of claim 1, wherein selecting, based on the ranking, the set of attributes from the plurality of attributes comprises:
    determining, based on a number of characters of a first attribute of the ranked plurality of attributes, that the first attribute will be displayed;

determining, based on a number of characters of a second attribute of the ranked plurality of attributes, that the second attribute will not be displayed;

calculating a difference between a first score of the first attribute and a second score of the second attribute;

determining whether the difference is below a threshold difference; and in response to determining that the difference is below the threshold difference, adjusting a font associated with the display area, wherein both the first attribute and the second attribute fit in the display area when generated for display in the adjusted font.

9. The method of claim 1, wherein generating for display the media asset identifier with the set of attributes comprises:

determining a first attribute of the set of attributes with a highest score; and generating for display the first attribute visually distinguished from other attributes in the set of attributes.

10. A system for presenting targeted metadata with media asset identifiers, the system comprising:

storage circuitry configured to store a user profile associated with a user; and control circuitry configured to:

retrieve a plurality of attributes associated with a media asset;

generate a score for each attribute of the plurality of attributes by:

determining, based on a current time and a location of the user, a context for each attribute by:

transmitting, to a social media website, the current time and the location;

receiving, from the social media website, a data structure including a plurality of topics at the current time and the location;

comparing each attribute to each topic of the plurality of topics received from the social media website;

identifying, based on the comparing, that a first subset of the plurality of attributes associated with the media asset each correspond to a respective topic of the plurality of topics; and;

determining the context for each attribute in the first subset based on the corresponding topic of the plurality of topics;

determining, from the user profile associated with the user, a user preference for each attribute;

assigning both (1) a context value to each attribute based on the context and (2) a user weighting to each attribute based on the user preference; and calculating the score based on the context value for each attribute and the user weighting for each attribute;

rank the plurality of attributes based on the score for each attribute;

determine a display size of a media asset identifier associated with the media asset;

based on the display size, determine a number of characters that fit in a display area;

select, based on the ranking, a set of attributes from the plurality of attributes, wherein the total number of characters in the set does not exceed the determined number of characters that fit in the display area; and generate for display the media asset identifier with the set of attributes.

11. The system of claim 10, wherein the control circuitry is further configured, when determining, based on the current time and the location of the user, the context for each attribute, to:

compare the current time and the location of the user to a plurality of current times and locations stored in a database;

determine that the current time and location of the user matches a stored time and a stored location in the database;

retrieve, from a field associated with the matched stored time and the matched stored location, a context mapping for attributes;

process each attribute of the plurality of attributes associated with the media asset with the context mapping for attributes; and determine the context for each attribute of the plurality of attributes based on output of the context mapping.

12. The system of claim 10, wherein the control circuitry is further configured, when determining, from the user profile associated with the user, the user preference for each attribute, to:

retrieve the user profile;

retrieve user preferences for the user from the user profile;

compare each attribute to each user preference of the user preferences;

identify, based on comparing each attribute to each user preference of the user preferences, that a second subset of the plurality of attributes associated with the media asset each correspond to a respective user preference of the user preferences; and determine the user preference for each attribute in the second subset based on the corresponding user preference of the user preferences.

13. The system of claim 10, wherein the control circuitry is further configured, when calculating the score based on the context value for each attribute and the user weighting for each attribute, to:

retrieve a data structure with default scores for the plurality of attributes associated with the media asset;

retrieve, from a field corresponding to each attribute of the plurality of attributes, a default score for each attribute; and adjust the default score for each attribute based on the context value and the user weighting.

14. The system of claim 10, wherein the control circuitry is further configured, when determining the display size of the media asset identifier associated with the media asset, to:

receive a user input corresponding to a request to generate a display with the media asset identifier;

retrieve a display template that corresponds to the user request, wherein the display template includes a plurality of display sizes associated with objects to be displayed;

determine that the media asset identifier associated with the media asset corresponds to a first object to be displayed; and retrieve, from the display template, the display size associated with the first object to be displayed.

15. The system of claim 10, wherein the control circuitry is further configured, when determining the number of characters that fit in the display area, to:

determine a font type to be displayed in the display area;

retrieve an average character size for the font type;

compare the average character size to the display size of the media asset identifier; and based on comparing the average character size to the display size, determine the number of characters that fit in the display area.

16. The system of claim 10, wherein the control circuitry is further configured, when selecting, based on the ranking, the set of attributes from the plurality of attributes, to:
retrieve, from the user profile, a user display rating for each attribute type of a plurality of attribute types; and
maximize a total user display rating of attributes that are displayed by:
determining an attribute type for each attribute of the plurality of attributes associated with the media asset;
determining a user display rating for each attribute of the plurality of attributes based on the respective attribute type;
identifying attributes of the plurality of attributes that maximize the total user display rating by processing the ranked plurality of attributes with a model including both (1) the user display rating and (2) a number of characters of each attribute of the plurality of attributes; and
selecting the identified attributes as the set of attributes.

17. The system of claim 10, wherein the control circuitry is further configured, when selecting, based on the ranking, the set of attributes from the plurality of attributes, to:
determine, based on a number of characters of a first attribute of the ranked plurality of attributes, that the first attribute will be displayed;
determine, based on a number of characters of a second attribute of the ranked plurality of attributes, that the second attribute will not be displayed;
calculate a difference between a first score of the first attribute and a second score of the second attribute;
determine whether the difference is below a threshold difference; and
in response to determining that the difference is below the threshold difference, adjust a font associated with the display area, wherein both the first attribute and the second attribute fit in the display area when generated for display in the adjusted font.

18. The system of claim 10, wherein the control circuitry is further configured, when generating for display the media asset identifier with the set of attributes, to:
determine a first attribute of the set of attributes with a highest score; and
generate for display the first attribute visually distinguished from other attributes in the set of attributes.

* * * * *